(12) United States Patent
Rochelle et al.

(10) Patent No.: US 9,861,076 B2
(45) Date of Patent: Jan. 9, 2018

(54) SYSTEMS AND METHODS OF DEFINING BOUNDARY REGIONS FOR ANIMALS

(71) Applicants: Radio Systems Corporation, Knoxville, TN (US); XYZ Microsystems, LLC, Knoxville, TN (US)

(72) Inventors: James M. Rochelle, Knoxville, TN (US); Rungwit Sangsingkeow, Knoxville, TN (US); Benjamin S. Protho, Knoxville, TN (US); Thomas B. Lee, Seymour, TN (US)

(*) Notice: Subject to any disclaimer, the term of this patent is extended or adjusted under 35 U.S.C. 154(b) by 503 days.

(21) Appl. No.: 14/266,216

(22) Filed: Apr. 30, 2014

(65) Prior Publication Data

US 2014/0320347 A1    Oct. 30, 2014

Related U.S. Application Data

(60) Provisional application No. 61/817,766, filed on Apr. 30, 2013.

(51) Int. Cl.
*A01K 15/02* (2006.01)
*A01K 15/00* (2006.01)

(52) U.S. Cl.
CPC .................. *A01K 15/023* (2013.01)

(58) Field of Classification Search
CPC .... A01K 15/02; A01K 15/021; A01K 15/023; A01K 3/00; A01K 3/002; A01K 3/005; A01K 27/001; H05C 3/00; G01S 13/02; G01S 13/50; G01S 13/52; G01S 13/56; G08B 21/18; G08B 21/22

USPC ...................................................... 119/721
See application file for complete search history.

(56) References Cited

U.S. PATENT DOCUMENTS

| | | |
|---|---|---|
| 3,046,549 A | 7/1962 | Kalmus |
| 3,121,228 A | 2/1964 | Kalmus |
| 3,868,565 A | 2/1975 | Kuipers |
| 3,983,474 A | 9/1976 | Kuipers |
| 4,017,858 A | 4/1977 | Kuipers |
| 4,054,881 A | 10/1977 | Raab |
| 4,287,809 A | 9/1981 | Egli et al. |
| 4,298,874 A | 11/1981 | Kuipers |
| 4,314,251 A | 2/1982 | Raab |
| 4,346,384 A | 8/1982 | Raab |
| 4,560,930 A | 12/1985 | Kouno |

(Continued)

FOREIGN PATENT DOCUMENTS

| | | |
|---|---|---|
| CA | 2677059 | 7/2008 |
| EP | 2108179 | 7/2009 |
| WO | WO2008/094711 | 8/2008 |

*Primary Examiner* — Bernarr E Gregory
(74) *Attorney, Agent, or Firm* — Pitts & Lake, P.C.

(57) ABSTRACT

Systems and methods of determining a boundary area for animals, including a transmitter unit to generate and transmit a plurality of boundary signals, a receiver unit having one or more sensors to detect one or more characteristics of the boundary signals, and a user interface configured to communicate with the receiver unit, the user interface including a boundary program component to sequentially acquire boundary data corresponding to the plurality of boundary signals at a series of boundary perimeter locations, and to transmit the acquired data and instructions to the receiver unit to enable the receiver unit to determine proximity of the receiver unit relative to each perimeter location.

20 Claims, 17 Drawing Sheets

(56) References Cited

U.S. PATENT DOCUMENTS

| | | | |
|---|---|---|---|
| 4,598,272 A | 7/1986 | Cox | |
| 4,675,656 A | 6/1987 | Narcisse | |
| 4,710,708 A | 12/1987 | Rorden et al. | |
| 4,737,794 A | 4/1988 | Jones | |
| 4,742,356 A | 5/1988 | Kuipers | |
| 4,785,291 A | 11/1988 | Hawthorne | |
| 4,812,812 A | 3/1989 | Flowerdew et al. | |
| 4,814,751 A | 3/1989 | Hawkins et al. | |
| 4,898,120 A | 2/1990 | Brose | |
| 5,067,441 A | 11/1991 | Weinstein | |
| 5,241,923 A * | 9/1993 | Janning | A01K 15/023 119/721 |
| 5,381,129 A | 1/1995 | Boardman | |
| 5,425,367 A | 6/1995 | Shapiro et al. | |
| 5,477,210 A | 12/1995 | Belcher | |
| 5,589,821 A | 12/1996 | Sallen et al. | |
| 5,646,525 A | 7/1997 | Gilboa | |
| 5,661,459 A | 8/1997 | Belcher | |
| 5,774,631 A | 6/1998 | Chiabrera et al. | |
| 5,852,403 A | 12/1998 | Boardman | |
| 5,868,100 A * | 2/1999 | Marsh | A01K 15/023 119/421 |
| 5,870,973 A * | 2/1999 | Touchton | A01K 15/023 119/720 |
| 5,913,820 A | 6/1999 | Bladen et al. | |
| 5,949,350 A * | 9/1999 | Girard | A01K 15/023 340/539.1 |
| 5,982,291 A * | 11/1999 | Williams | A01K 3/005 256/10 |
| 6,043,748 A * | 3/2000 | Touchton | A01K 15/02 119/721 |
| 6,064,308 A * | 5/2000 | Janning | A01K 15/023 119/721 |
| 6,166,643 A * | 12/2000 | Janning | A01K 15/023 119/721 |
| 6,188,355 B1 | 2/2001 | Gilboa | |
| 6,232,880 B1 * | 5/2001 | Anderson | A01K 15/023 119/421 |
| 6,232,916 B1 * | 5/2001 | Grillo | A01K 15/023 119/721 |
| 6,271,757 B1 * | 8/2001 | Touchton | A01K 15/02 119/721 |
| 6,392,547 B1 | 5/2002 | Stewart et al. | |
| 6,415,742 B1 * | 7/2002 | Lee | A01K 15/023 119/719 |
| 6,427,079 B1 | 7/2002 | Schneider et al. | |
| 6,542,838 B1 | 4/2003 | Haddad et al. | |
| 6,581,546 B1 | 6/2003 | Dalland et al. | |
| 6,600,422 B2 * | 7/2003 | Barry | A01K 15/023 119/719 |
| 6,700,492 B2 * | 3/2004 | Touchton | A01K 15/02 119/721 |
| 6,812,839 B1 | 11/2004 | Belcher et al. | |
| 6,879,300 B2 | 4/2005 | Rochelle et al. | |
| 6,923,146 B2 * | 8/2005 | Kobitz | A01K 15/023 119/721 |
| 6,935,621 B2 * | 8/2005 | Maceri | A01K 3/005 256/10 |
| 7,081,821 B2 * | 7/2006 | So | A01K 15/023 119/720 |
| 7,126,475 B2 * | 10/2006 | So | A01K 15/023 119/720 |
| 7,142,167 B2 | 11/2006 | Rochelle et al. | |
| 7,259,718 B2 * | 8/2007 | Patterson | A01K 15/023 342/463 |
| 7,546,817 B2 * | 6/2009 | Moore | A01K 15/023 119/720 |
| 7,565,885 B2 * | 7/2009 | Moore | A01K 15/023 119/720 |
| 7,602,302 B2 * | 10/2009 | Hokuf | A01K 27/001 340/539.13 |
| 7,656,291 B2 | 2/2010 | Rochelle et al. | |
| 7,918,190 B2 * | 4/2011 | Belcher | A01K 15/023 119/721 |
| 8,115,642 B2 * | 2/2012 | Thompson | A01K 15/023 340/539.13 |
| 8,922,363 B2 * | 12/2014 | So | A01K 15/023 119/719 |
| 8,955,462 B1 * | 2/2015 | Golden | A01K 15/023 119/721 |
| 9,226,479 B2 * | 1/2016 | Bianchi | A01K 15/021 |
| 2001/0040508 A1 | 11/2001 | Janning et al. | |
| 2001/0042522 A1 | 11/2001 | Barry et al. | |
| 2005/0066912 A1 * | 3/2005 | Korbitz | A01K 15/023 119/721 |
| 2005/0077085 A1 | 4/2005 | Zeller et al. | |
| 2005/0288007 A1 * | 12/2005 | Benco | G08B 21/22 455/422.1 |
| 2006/0112901 A1 * | 6/2006 | Gomez | A01K 15/023 119/721 |
| 2006/0190899 A1 | 8/2006 | Migatz et al. | |
| 2009/0102668 A1 * | 4/2009 | Thompson | A01K 15/023 340/573.3 |
| 2010/0201561 A1 * | 8/2010 | Dhondt | G01S 13/56 342/27 |
| 2013/0157628 A1 * | 6/2013 | Kim | A01K 15/023 455/414.1 |

* cited by examiner

SYSTEMS AND METHODS OF DEFINING BOUNDARY REGIONS FOR ANIMALS

This application claims the benefit of U.S. Provisional Patent Application Ser. No. 61/817,766, filed on Apr. 30, 2013, the disclosure of which is incorporated herein in its entirety by reference.

BACKGROUND OF THE INVENTION

1. Field of Invention

The present general inventive concept relates to wireless boundary systems and methods, and, more particularly, to testing and defining wireless boundaries for animals.

2. Description of the Related Art

Conventional wireless fence systems for animals typically include a receiver unit worn by an animal to determine proximity of the receiver unit to a predetermined wireless boundary according to a user generated signal or a boundary signal sensed by the receiver unit. An example system is described in U.S. Pat. No. 7,656,291, the disclosure of which is incorporated by reference herein in its entirety.

BRIEF SUMMARY

Example embodiments of the present general inventive concept may be achieved by providing a boundary determining system including at least one transmitter unit to generate and transmit a plurality of boundary signals, a receiver unit having one or more sensors to detect one or more characteristics of the boundary signals, and a user interface configured to communicate with the receiver unit, the user interface including a boundary program component to sequentially acquire boundary data corresponding to the plurality of boundary signals at a series of boundary perimeter locations, and to transmit the data and instructions to the receiver unit to enable the receiver unit to determine proximity of the receiver unit relative to each perimeter location.

The user interface may include a boundary test component to measure the plurality of boundary signals at each of the series of perimeter locations proximate a perimeter of a boundary area to determine whether one or more of the measured signals satisfy one or more prescribed conditions.

The user interface may include a boundary scan component to identify one or more geographic areas within the boundary where the one or more measured signals fail to satisfy one or more prescribed conditions The receiver unit may be configured to be carried by an animal, and the receiver unit may include a stimulus delivery unit to deliver a stimulus to the animal when the receiver unit is located a predetermined distance relative to the perimeter of the boundary.

The boundary program component may be configured to transmit instructions to the receiver unit to disable the stimulus delivery unit when the receiver unit enters a house or building within the boundary area.

The boundary area may be a partial boundary, and the series of perimeter locations may include first and second locations respectively defining endpoints of the partial boundary, and the boundary program component may be configured to disable the stimulus delivery unit when the receiver unit crosses an angular dependent reference line associated with the first and/or second location.

The boundary program component may be configured to disable the stimulus delivery unit when the receiver unit crosses the angular dependent reference line from a first direction, and to enable the stimulus delivery unit when the receiver unit crosses the angular dependent reference line from a second direction.

The series of perimeter locations may include one or more locations respectively defining one or more doorway locations proximate a doorway of a house or building adjacent the boundary, and the boundary program component may be configured to disable the stimulus delivery unit when the receiver unit crosses the doorway from a first direction, and to enable the stimulus delivery unit when the receiver unit crosses the doorway from a second direction.

The doorway location may be a pet door.

The boundary determining system may include a remote signaling device operable by a user to transmit instructions to the receiver unit to enable and/or disable the stimulus delivery unit.

The receiver unit may be provided with a processor to determine location information from the detected one or more characteristics of the boundary signals.

The receiver unit may be provided with a communication unit to transmit the detected one or more characteristics of the boundary signals to a remote processor configured to determine location information of the receiver unit from the detected one or more characteristics of the boundary signals, and to receive the determined location information from the remote processor.

The receiver unit may include a memory to store the data and instructions to enable the receiver unit to determine the proximity of the receive unit relative to the perimeter of the boundary, and a communication unit to communicate the data and instructions for use with another receiver unit.

The user interface may be located within the receiver unit, and the receiver unit may include a memory to store the data and instructions to enable the receiver unit to determine the proximity of the receiver unit relative to the perimeter of the boundary area.

The user interface may be a smart phone, a tablet device, a personal digital assistant (PDA), a portable game console, a portable/personal multimedia player (PMP), a handheld e-book, or a portable lab-top computer.

The user interface may include a communication means for transmitting data and instructions to a smart phone, a tablet device, a personal digital assistant (PDA), a portable game console, a portable/personal multimedia player (PMP), a handheld e-book, or a portable lab-top computer and/or receiving data and instructions from a smart phone, a tablet device, a personal digital assistant (PDA), a portable game console, a portable/personal multimedia player (PMP), a handheld e-book, or a portable lab-top computer.

The receiver unit may include a communication unit to communicate the data and instructions to another receiver unit.

The boundary may be a partial boundary defined by a perimeter having separate beginning and ending points.

The communication unit may be configured to communicate with a second receiver unit having different measurement sensitivities relative to said receiver unit, the user interface being configured to measure a reference point corresponding to the boundary data of said receiver unit and to calibrate the measurement sensitivities of the second receiver unit to enable the second receiver unit to determine a proximity of the second receiver unit relative to the boundary area perimeter consistent with said receiver unit.

Example embodiments of the present general inventive concept may also be achieved by providing a user interface for use with a boundary determining system, including a boundary program component to sequentially acquire boundary data corresponding to a plurality of boundary signals at locations along a perimeter of a boundary area, and to transmit data and instructions to a receiver unit to enable the receiver unit to determine proximity of the receiver unit relative to the perimeter of the boundary area.

The user interface may include a boundary test component to measure the plurality of boundary signals at a series of perimeter locations proximate a perimeter of the boundary area to determine whether one or more of the boundary signals satisfy one or more prescribed conditions at locations along the perimeter of the boundary area.

The user interface may include a boundary scan component to identify one or more geographic areas within the boundary area where the one or more measured boundary signals fail to satisfy one or more prescribed conditions.

The user interface may include a communication unit to communicate with a first receiver unit such that the communication unit transmits the boundary data and instructions from the user interface to the first receiver unit to enable the first receiver unit to determine the proximity of the first receiver unit relative to the boundary area perimeter.

The user interface may include a set-up component to enable a user to select a desired receiver unit correction level, to select a desired width of a boundary warning zone, and to select whether the receiver unit operates with a maximum correction range where a correction is automatically applied when a range is measured to exceed a fixed threshold level.

The boundary program component may prompt a user to observe designated spacing between predetermined locations along the boundary area perimeter.

The user interface may be a mobile communication device.

Processing instructions to control the boundary test component, boundary scan component, and boundary program component may be downloadable to or from the mobile communication device.

The user interface may be a smart phone, a tablet device, a personal digital assistant (PDA), a portable game console, a portable/personal multimedia player (PMP), a handheld e-book, or a portable lab-top computer.

The user interface device may include a communication means for transmitting the boundary data and instructions from the user interface to a smart phone, a tablet device, a personal digital assistant (PDA), a portable game console, a portable/personal multimedia player (PMP), a handheld e-book, or a portable lab-top computer and/or receiving data and instructions from a smart phone, a tablet device, a personal digital assistant (PDA), a portable game console, a portable/personal multimedia player (PMP), a handheld e-book, or a portable lab-top computer.

Example embodiments of the present general inventive concept may also be achieved by providing a method of programming a boundary area, including determining a plurality of points along a perimeter of a desired boundary area, detecting one or more signal characteristics of a boundary signal received at each of the plurality of points, determining whether the boundary signal satisfies one or more prescribed conditions at each of the plurality of points, adjusting a location of any boundary points at which the boundary signal does not satisfy the one or more prescribed conditions until the one or more prescribed conditions of the received boundary signal are satisfied, and programming location information acquired from signals measured along the perimeter of an adjusted boundary area into a receiver unit, thereby enabling the receiver to determine proximity of the receiver unit to said perimeter.

The determining of the plurality of boundary points may include placing visual markers at one or more of the boundary points.

Additional features and embodiments of the present general inventive concept will be set forth in part in the description which follows, and, in part, will be apparent from the description and figures, or may be learned by practice of the present general inventive concept.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
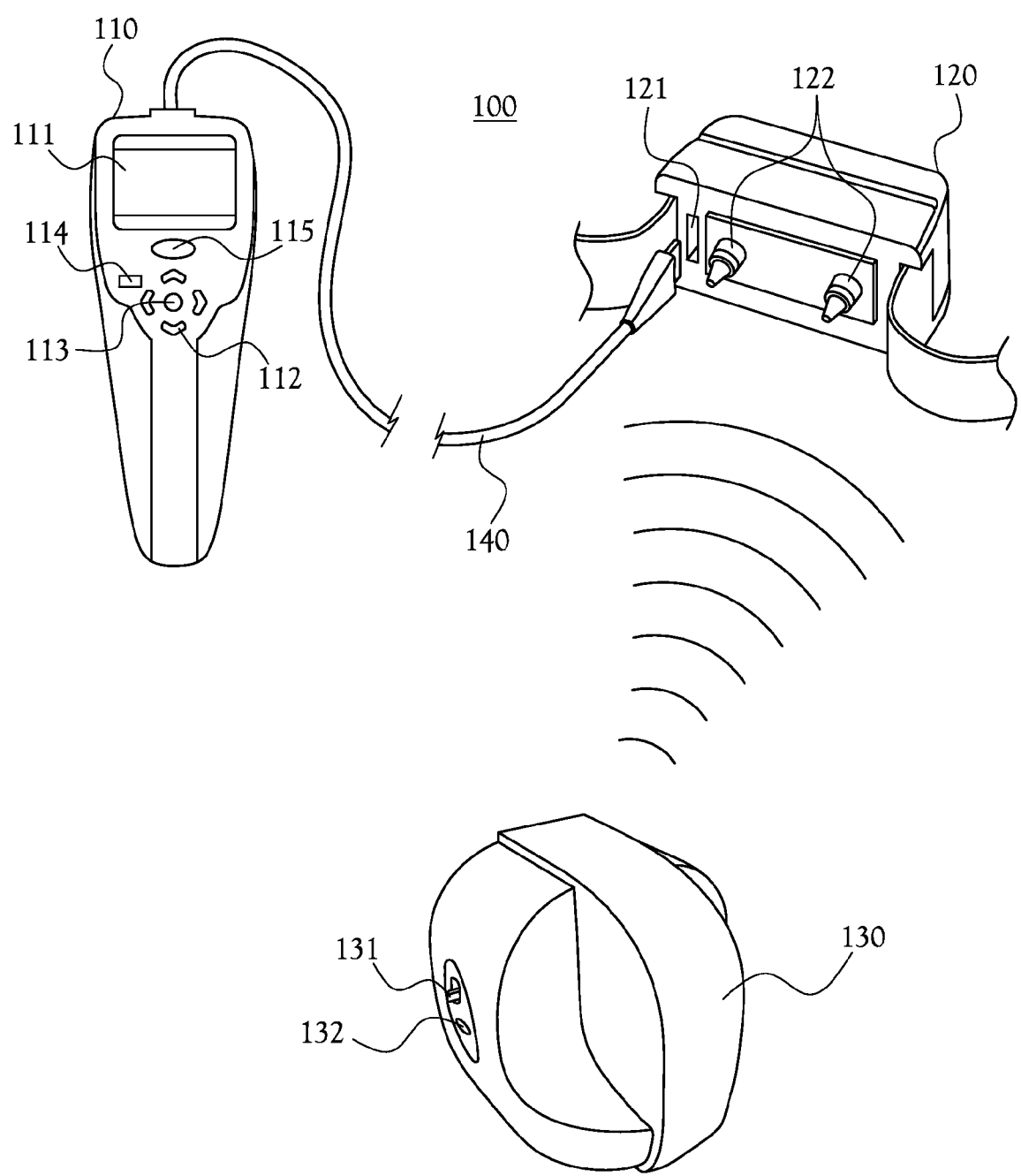
FIG. 1 illustrates a boundary determining system according to an example embodiment of the present general inventive concept.

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In various example embodiments, the present general inventive concept provides systems and methods of measuring potential and/or actual boundary signal characteristics along the wireless perimeter of a boundary area to determine whether the signal is suitable for boundary definition along the said perimeter. Such characteristics include, but are not limited to, angular dependent characteristics and range characteristics of the signal, which may, for example, be measured relative to one or more fixed reference points.

Various example embodiments of the present general inventive concept also provide systems and methods of determining proximity to a wireless boundary of programmable shape, for example as used for animal containment. A user is able to define a desired boundary by programming a receiver unit to recognize geographical points according to sensed characteristics such as the intensities and polarities of magnetic fields generated by a base station transmitter located inside the boundary. The receiver unit determines whether the receiver unit is within or outside, and/or approaching, the boundary by determining the current location of the receiver unit in terms of the sensed intensities and polarities of the magnetic fields and comparing the current location to the boundary.

Example embodiments of the present general inventive concept provide a handheld boundary programming unit to perform testing operations to test potential boundary locations to determine whether the respective locations are suitable to be evaluated by location sensors in a receiver unit, indicating to a user various information as to why locations may be unsuitable, programming multiple receiver units to recognize a common boundary, and the like, or various combinations of these operations. It is understood that the various example embodiments described herein may include descriptions of specific components, values, parameters, titles, processes, instructions, or other items that are included for convenience of description and operation, but it is understood that the present general inventive concept is not limited to such features described in these example embodiments.

Moreover, it is noted that the present general inventive concept is applicable to a range of pets or other animals, domestic and otherwise, even though the example embodiments of the present general inventive concept described herein primarily describe dogs as being the animals contained by the wireless mapping fence. Thus, it is understood that the term "pet" is used in the following various descriptions in a general sense, and may refer to dogs or any other various animals which a user wants to be subjected to the custom boundaries discussed herein. It is also noted that the present general inventive concept may be applicable to determining the proximity of various types of mobile subjects, including animals, persons or machines, relative to the perimeter of a defined boundary area. Furthermore, various example embodiments of the receiver unit relate to a receiver collar to be worn by an animal, but the receiver unit is not limited to a receiver collar. For example, the receiver unit could be a harness, saddle, jacket, blanket, earpiece, implant, or other device attached to or carried by the mobile subject.

FIG. 1 illustrates a boundary determining system according to an example embodiment of the present general inventive concept. It is understood that the example embodiment of FIG. 1 merely illustrates a few of the components that may be used in the boundary determining system 100, and that these components are not drawn to scale. In this example embodiment, the boundary determining system 100 includes a handheld boundary programming unit (BPU) 110 to define boundary data, a receiver unit 120 configured to communicate with, and be programmed by, the BPU 110, and a fence transmitter 130 configured to transmit a radio signal to communicate with the receiver unit 120. In various example embodiments, the BPU 110 may be configured to communicate directly with the fence transmitter 130 along with the receiver unit 120. A communication means may be provided to either or both of the BPU 110 and the receiver unit 120 to enable wired and/or wireless communication to one another and/or other devices. A wide variety of communication means could be chosen using sound engineering judgment. In the example embodiment illustrated in FIG. 1, the BPU 110 is configured to communicate with the receiver unit through a wired connection unit such as a USB communication port 140. In various other example embodiments the BPU 10 may be configured with a communication unit to communicate with the receiver unit 120 in a wireless fashion. The receiver unit 120 may be provided with a USB port 121 and/or a wireless transceiver or other communication unit. As illustrated in FIG. 1, the receiver unit 120 may be provided with contact points 122 to provide a stimulus to the wearer of the receiver unit 120, but other example embodiments may include an emitter to provide an audible stimulus (sound, message, etc.) to the wearer of the receiver unit, or a flashing light, etc., in lieu of, or in combination with, a physical stimulus. For pet containment applications, any type of stimulus or action of the stimulus delivery device which may be presented to a pet to help control the behavior of the pet and/or dissuade the pet from crossing the boundary, or various combinations of such stimuli, may be provided by the receiver unit 120 and are intended to fall within the scope of the term "stimulus" or "stimulus delivery device" as used herein. The fence transmitter 130, provided with a power switch 131 and on/off indicator 132, may be configured to be readily wall-mountable so as to be installed in or on a structure within the desired boundary area. The fence transmitter 130 may be provided with a transmitter frequency switch so as to avoid interference with similarly transmitting containment systems or other signals on neighboring properties.

The BPU 110 may be provided with a user interface that includes a display screen 111, directional buttons 112 which allow a user to navigate a cursor or other display indicator displayed on the display screen 111, an OK/enter button 113 to cause the execution of a selected process, and a back button 114 to allow a user to return to a previous display. The BPU 110 may also include an on/off button 115 to power the BPU 110 on and off. In other various example embodiments, the BPU may include a graphical user interface including a touch screen to allow a user to enter selections by touching the display itself, rather than manipulating buttons. In still other various example embodiments, a different mobile communication and/or processing device such as a smartphone, tablet, etc., may be used in lieu of the BPU 110 to communicate with the receiver unit 120.

In various example embodiments of the present general inventive concept, boundary flags may be positioned to define a particular geographic area to which the user desires a pet to be confined, referred to herein as a pet or boundary area. While boundary flags are described as boundary markers in most of the example embodiments described herein, it is understood that any type of visual marker may be used instead of, or in combination with, the described flags. This pet area, which will later be described in more detail, is the distance from the fence transmitter 130 that a pet can roam freely in a given direction. The boundary flags may be used to mark each boundary point to be programmed into the BPU 110 and to provide a visual reference for training of a pet. The BPU 110 or other suitable device may be used to collect boundary data proximate to the boundary flags, as well as other areas in and/or out of the boundary area, and to program the receiver unit 120. For pet containment applications, the receiver unit 120 may offer a number of different levels of correction, including but not limited to tone-only correction, which are adjustable to the pet's temperament. A user having multiple pets may download this boundary data into multiple receiver units corresponding to the multiple pets.

In various example embodiments, the fence transmitter 130 may be centrally located to the wireless mapping fence, and may transmit a radio signal up to, for example, 90 feet in all directions. The fence transmitter 130 may transmit a plurality of boundary signals, for example magnetic field signals, at various angular orientations with respect to the boundary area. Sensors located within the receiver unit may determine a current location of the receiver unit according to sensed characteristics of the magnetic fields, such as angular dependent characteristics and range characteristics of the magnetic fields relative to a series of points defining the boundary area.

For pet containment applications, the receiver unit 120 worn by the pet monitors the boundary signals and issues a stimulus signal if the pet approaches a warning zone associated with the boundary established by the user. In various example embodiments, the warning zone is programmable from approximately 1 to 5 feet from the boundary. According to various example embodiments, if the pet continues into a static correction area, which is the area beyond the warning zone in which the receiver unit 120 emits a correction stimulus, the receiver unit 120 may issue a harmless but startling correction, through the contact points 122 of the receiver unit 120 that contact the pet, until the pet returns to the pet area. The receiver unit 120 may be provided with one or more mode buttons to turn the receiver unit 120 on/off and adjust the static correction level. The receiver unit 120 may be provided with a receiver indicator light to indicate the level of correction at which the receiver unit 120 is set. Various other quantities of tones, corrections, associated levels and/or combinations thereof may be utilized in different example embodiments. For example, the receiver unit may emit various levels of auditory warnings, either in combination with or in lieu of a stimulus provided through contact points which contact the pet.

Figure 2:
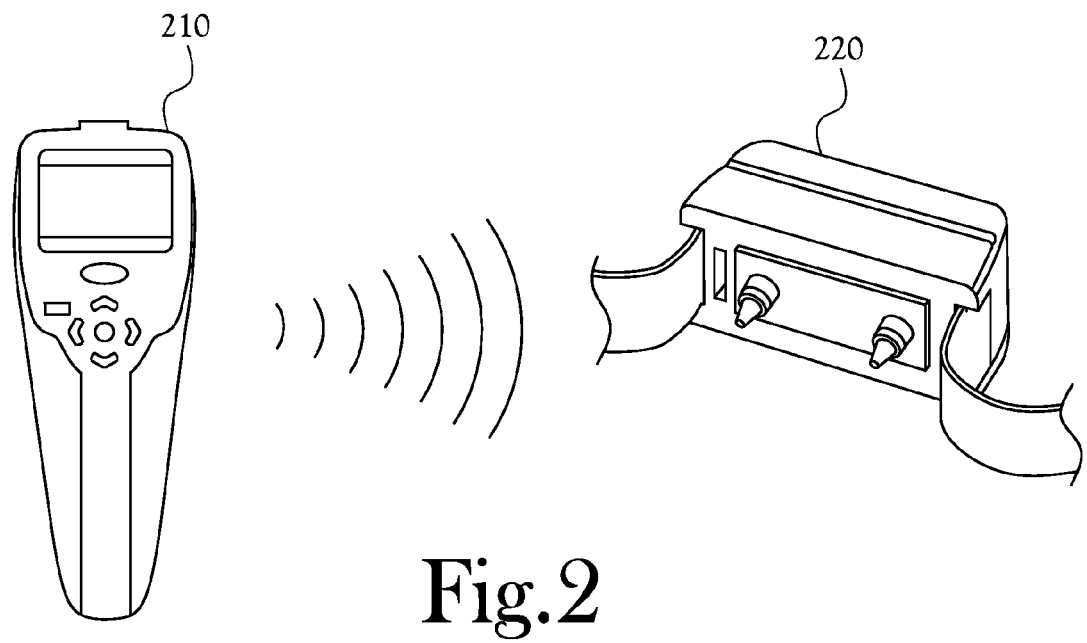
FIG. 2 illustrates a portion of the boundary determining system according to another example embodiment of the present general inventive concept.

FIG. 2 illustrates a portion of the boundary determining system 100 according to another example embodiment of the present general inventive concept. In the example embodiment of FIG. 2, a BPU 210 is configured to communicate in a wireless fashion, such as, for example, by a BLUETOOTH® connection, with a receiver unit 220 that is provided with a wireless transceiver or other communication unit. The receiver unit 220 provided with the wireless transceiver or other communication unit may also be provided with a wired communication unit such as the USB port 121 to operate as a backup system to communicate with the BPU 210.

Figure 3:
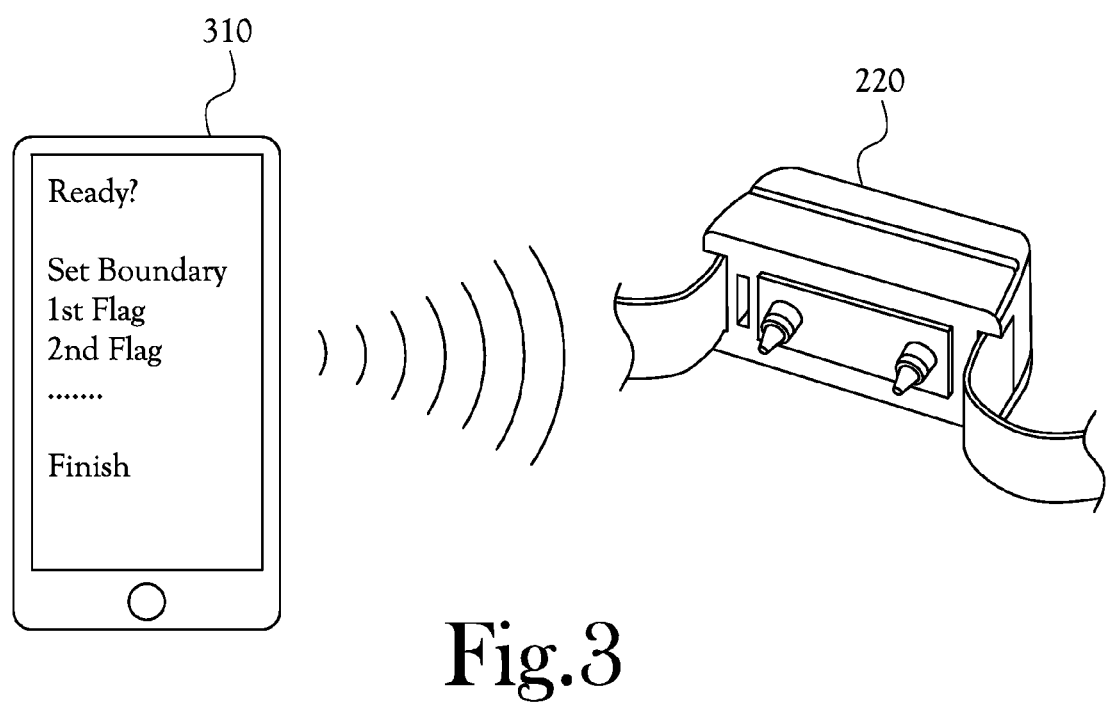
FIG. 3 illustrates a portion of the boundary determining system according to yet another example embodiment of the present general inventive concept.

FIG. 3 illustrates a portion of the boundary determining system 100 according to yet another example embodiment of the present general inventive concept. In the example embodiment of FIG. 3, a mobile processing device 310 is used to communicate with and program the receiver unit 220 in a wireless fashion. Any number of devices may serve as the mobile processing device 310, such as, for example, a cellular phone, a tablet device, a personal digital assistant (PDA), a portable game console, a portable/personal multimedia player (PMP), a handheld e-book, a portable lab-top PC, and the like capable of wireless communication or network communication consistent with that disclosed herein. In the example embodiment illustrated in FIG. 3, the mobile processing device 310 used is a tablet device on which a software application has been downloaded to allow the user to communicate with and program the receiver unit 220. On such a device, a graphical user interface may be displayed to allow a user to easily navigate among programming and evaluation options for the various boundary points.

Figure 4:
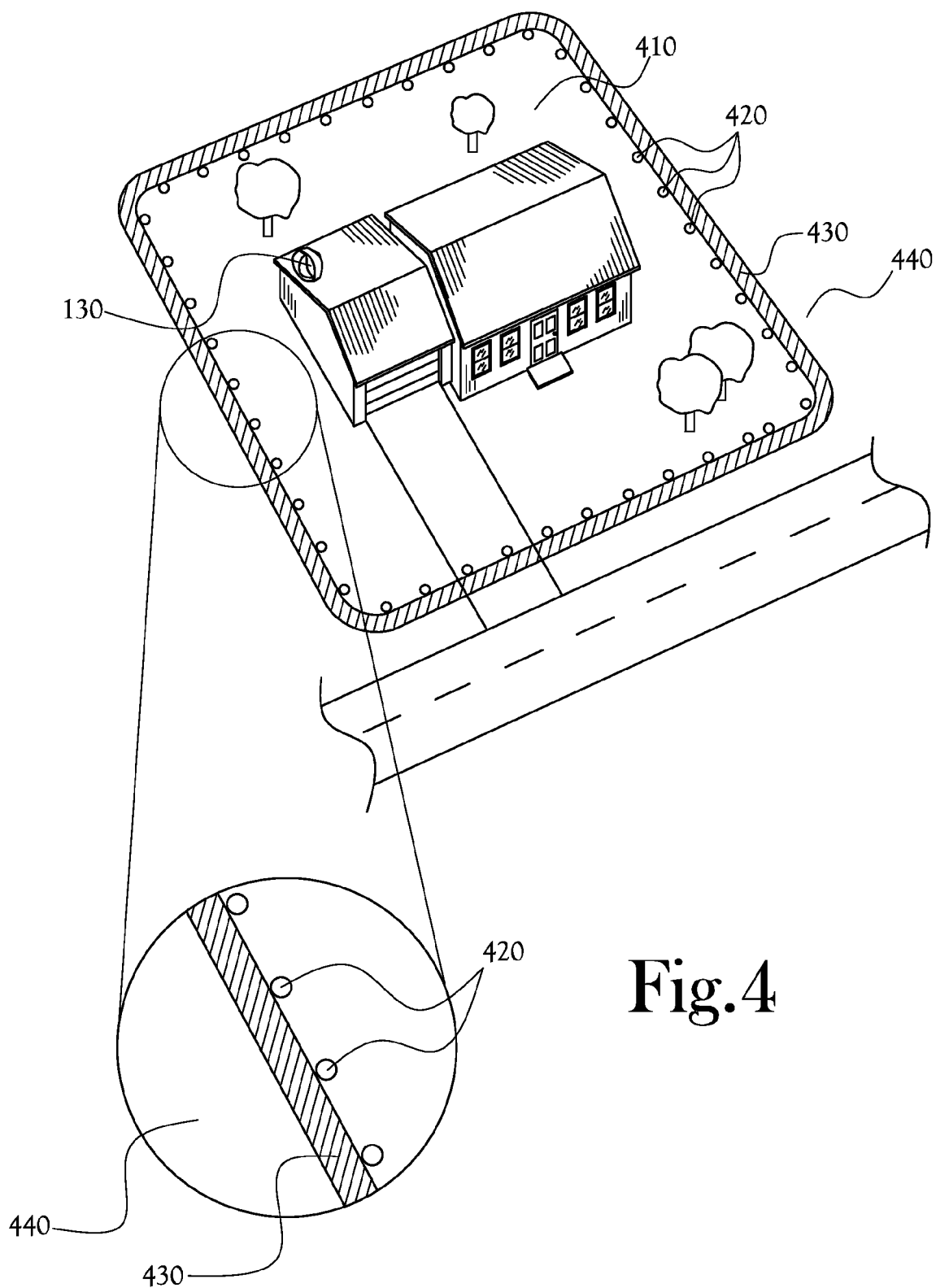
FIG. 4 illustrates an example boundary layout which may be evaluated and/or programmed by the boundary determining system of FIG. 1.

In various example embodiments of the boundary determining system 100, a user is able to set custom boundaries for the pet by programming the shape and location of the pet area. FIG. 4 illustrates an example boundary layout which may be evaluated and/or programmed by the boundary determining system 100 of FIG. 1. In the example illustrated in FIG. 4, the fence transmitter 130 is mounted in the garage of the home at the center of the desired pet area 410, and the boundary flags 420 have been placed at various points along the boundary which will be tested and/or programmed by the user. Once the boundary has been programmed, the warning zone 430 may begin at approximately the line formed by the boundary flags, and the static zone 440 may be defined at starting at the outer edge of the warning zone 430. In some example embodiments, the warning zone 430 may be programmable to a width of approximately 1-5 feet. Thus, the boundary determining system 100 allows the user to set custom boundaries for the pet by programming the shape and location of the pet area 410. After positioning the boundary flags 420 to define the pet area 410, the BPU 110 may be used to collect boundary data and program the receiver unit 120. In various example embodiments, the receiver unit 120 offers five levels of correction in physical and/or audible stimulus signals, adjustable to the temperament of the pet. For the user with multiple dogs, the boundary data collected by the BPU 110 may be downloaded into multiple receiver units. The fence transmitter 130 may transmit a radio signal up to 90 feet in all directions, and the receiver unit 120, once programmed, will monitor the pet's location and issue a warning stimulus if the pet approaches the warning zone 430. If the pet continues into the static correction area 440, the receiver unit 120 may issue the harmless but startling correction through the contact points and/or emitter until the pet returns to the pet area. The boundary may be used in conjunction with a physical privacy fence if the pet is prone to digging under such a fence. As previously noted, various parameters described herein, such as the five levels of correction plus tone-only, the 90-feet signal transmission, and so on are merely examples of one embodiment of the present general inventive concept, and one or more of such aspects may vary according to different example embodiments. As another example, while the fence transmitter 130 of this example embodiment is described as being mounted in a dry, well ventilated, protected area, such conditions are not applicable to other example embodiments. For example, various other example embodiments may include a fence transmitter housed in a weather-proof housing that does not require the protected area described in this example embodiment. Still other example embodiments may include a receiver component that is not coupled to a unit at all, but is provided to the pet in an altogether different manner such as an attachment member coupled to the pet's fur, and so on.

The warning zone of this example embodiment is described as being from approximately 1 to 5 feet, but various other example embodiments may employ warning zones of smaller or larger sizes, or even progressively different zones within the warning zone.

The receiver unit 120 may include a receiver indicator light (not shown) to indicate reception of the transmission from the fence transmitter 130, contact points 122 to deliver the correction stimulus to the pet, a receiver charge jack to receive a receiver charger to charge the receiver unit 120, and a mode button (not shown) to be used by a user to select the desired mode of operation. The fence transmitter 130 of this example embodiment may include a power indicator 132, a power switch 131, a power jack (not shown) to receive the transmitter power adapter, and a frequency switch (not shown). The BPU 110 of this example embodiment may include a power switch 115 and a plurality of user control buttons 112-114. It is understood that various other example embodiments may employ fewer, more, or different components than those illustrated in this example, and with different configurations. For example, the BPU 110 may be provided with a touch-screen display, rather than the button based user interface, for the user to enter various commands and view display information.

As previously described, the boundary will be defined by the flags 420 set by the user, which may serve as visual cues for the training of a pet, as well as data points at which measurement information may be gathered by the BPU 110 (as will be discussed later). The user may design a full boundary which completely encircles an area such as that around a house or other building/structure, or may design one or more partial boundaries, which do not completely encircle the transmitter, having starting and ending points at physical barriers such as a fence, house, body of water, and so on. Such partial boundaries may be appropriate if the user wants to limit the containment area to a smaller portion of the yard, such as the back or front yard, to avoid running the boundary proximate to buried utilities, to establish a boundary for a house that is larger than a maximum range of the fence transmitter 130, and so on.

Figure 5:
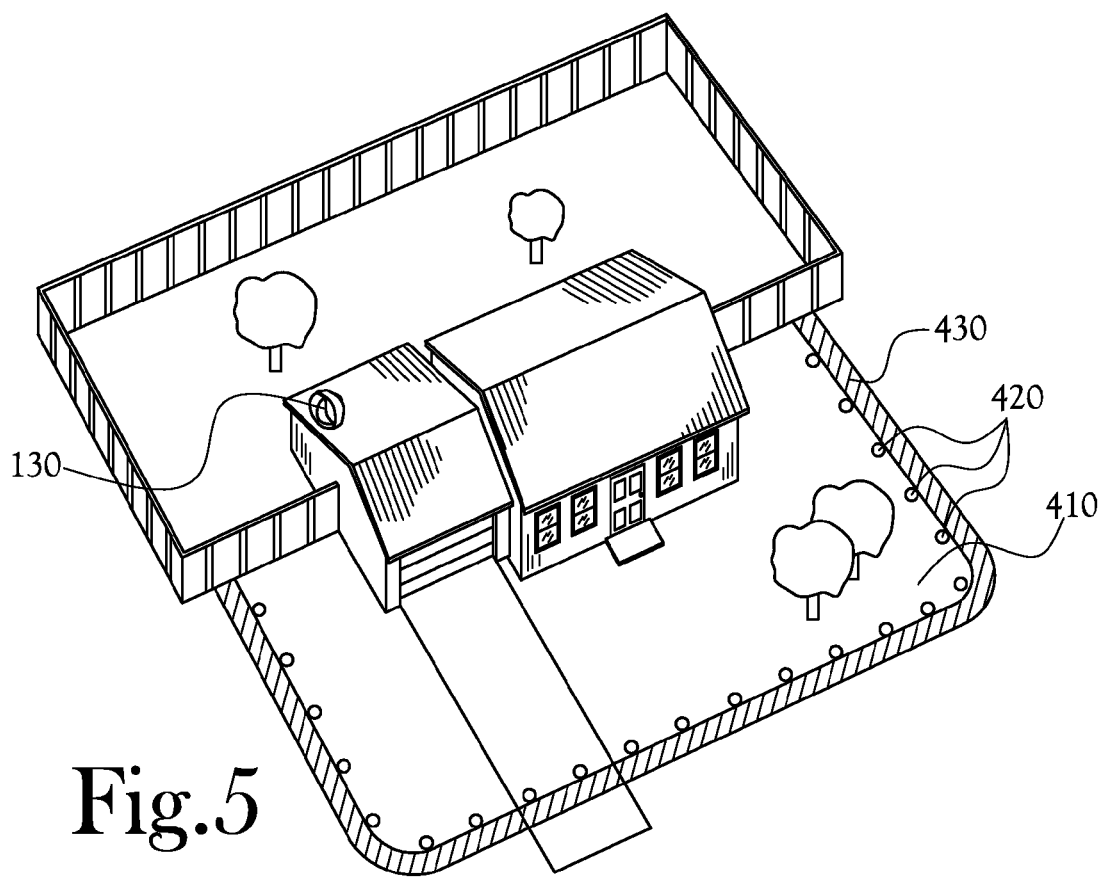
FIGS. 5-7 illustrate various examples of partial boundary layouts which may be evaluated and/or programmed by the boundary determining system of FIG. 1.
Figure 6:
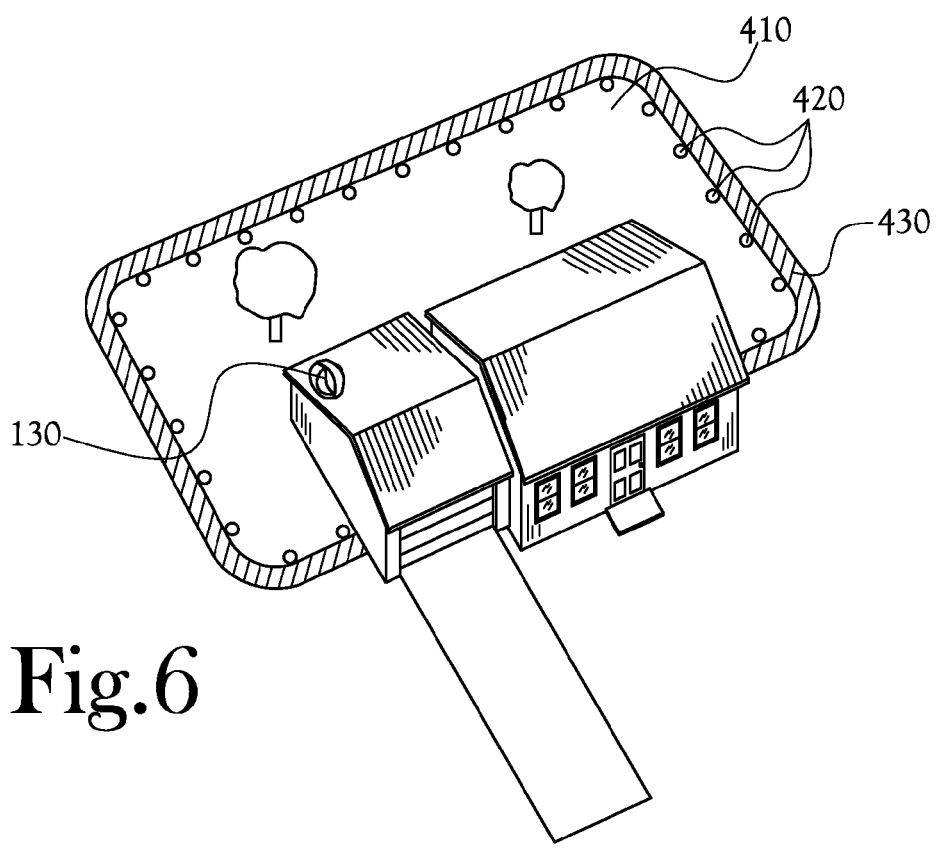
Figure 7:
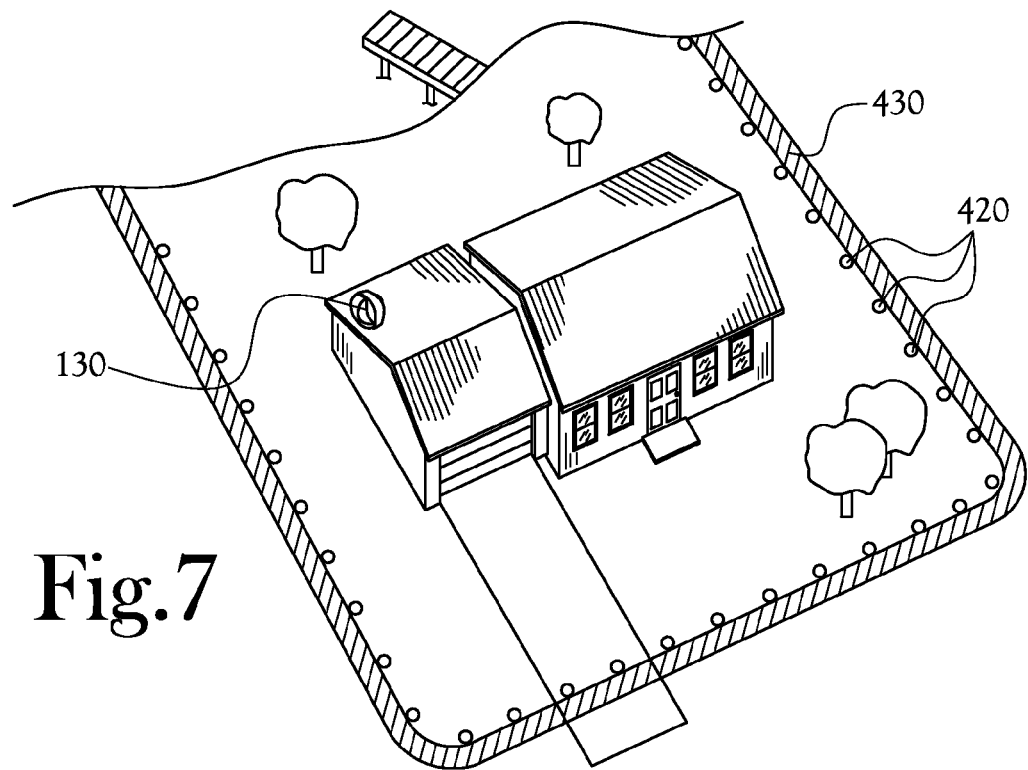

FIG. 4 illustrates a full programmable boundary around a fence transmitter 130. FIG. 5 illustrates a partial boundary around a front yard of a home, the partial boundary having end points at a privacy fence which surrounds the back yard of the home. FIG. 6 illustrates a partial boundary around a back yard of a home, the partial boundary having end points at opposing sides of the home. FIG. 7 illustrates a partial boundary having three sides surrounding a corresponding three sides of the home, and having end points at a body of water located behind the home. A host of different configurations may be possible according to different embodiments of the present general inventive concept.

In one example embodiment of the present general inventive concept, a full boundary may use of a minimum of 40, and a maximum of 128, programmed boundary flags, but lower and/or higher quantities may be utilized according to various different example embodiments. Also, while a 90 feet maximum range is described in this example embodiment, different example embodiments may have different possible ranges. Similarly, various aspects may be involved in the installation of the fence transmitter and boundary of the example embodiment of the present general inventive concept. While the transmitter of most of these example embodiments is described as being located in a dry and protected area, away from metal surfaces, etc., different example embodiments may be provided with differently constructed and/or configured transmitters that may be less sensitive to such locations.

Figure 8:
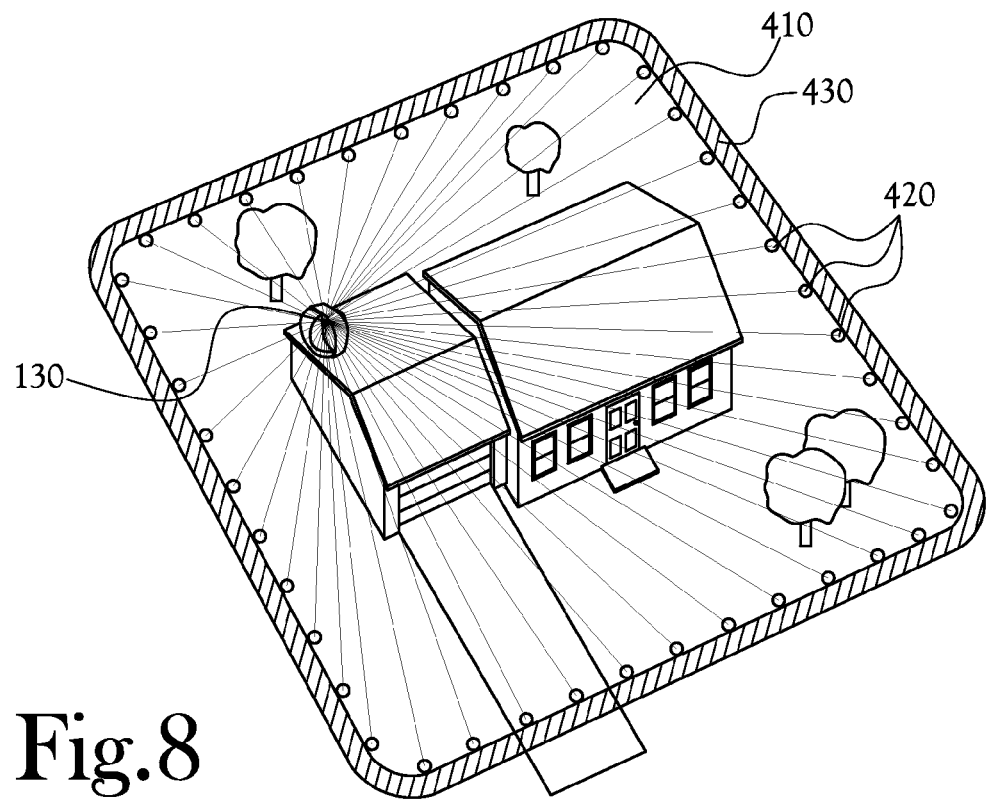
FIG. 8 illustrates an example of unique radial lines from the fence transmitter to the boundary points in a full boundary.

During the programming of the boundary line, the user places the boundary flags 420 so as to have unique radial lines to the fence transmitter 130, and such that the radial lines do not cross one another. In various example embodiments of the present general inventive concept, the user may wish to avoid buried utility lines so that no corresponding interference is encountered regarding the signal of the fence transmitter 130 to the boundary points. However, one or more of these recommendations may not be applicable, or of as much importance, in different example embodiments of the present general inventive concept. FIG. 8 illustrates an example of unique radial lines from the fence transmitter 130 to the boundary points 420 in a full boundary. As illustrated in FIG. 8, no radial line from the fence transmitter 130 to any of the boundary flags 420 crosses any other radial line, and thus the radial lines are unique and the boundary flags 420 are in proper placement.

Figure 9A:
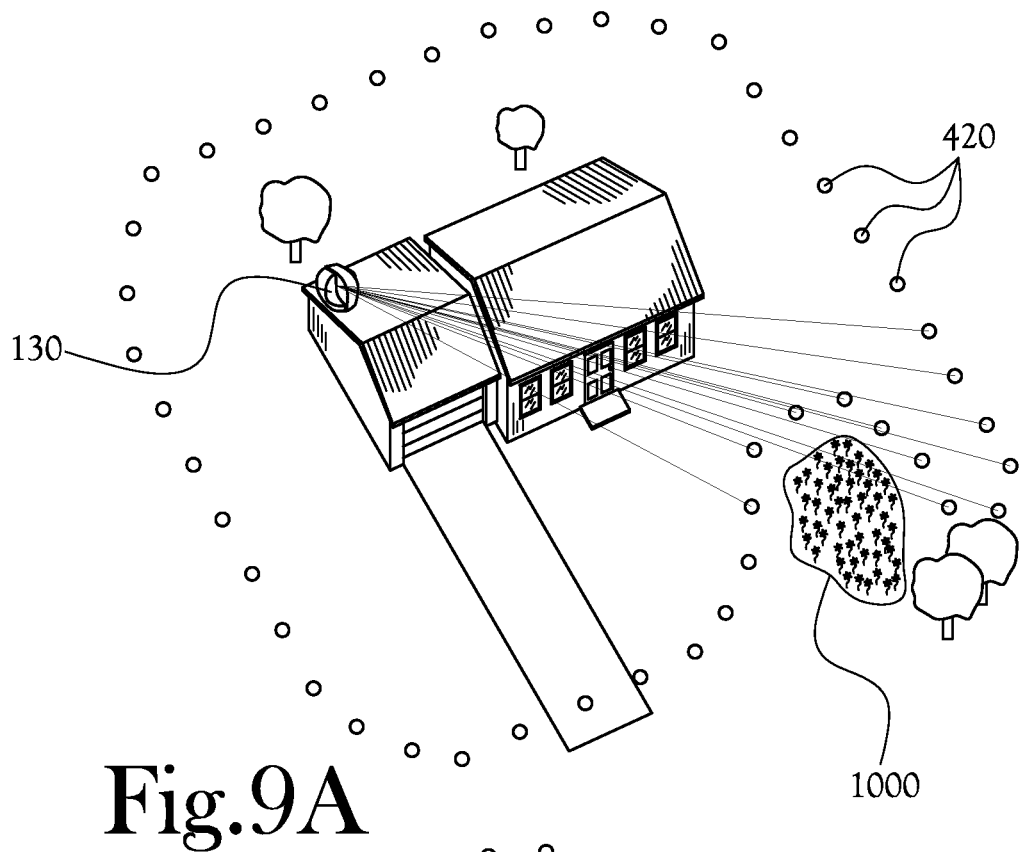
FIGS. 9A-11B illustrate examples of various potential boundary problems that may be defined by the placement of boundary flags, as well as example solutions to the potential boundary problems.

FIGS. 9A-11B illustrate various boundaries that may be defined by the placement of the boundary flags 420 by the user, and various benefits or problems that may correspond to such placement. For example, a user defined boundary which results in multiple boundary flags blocking unique radial lines to the transmitter may be improved by moving the boundary flags to eliminate a portion of the pet area, thus allowing each boundary flag point to have a unique line to the transmitter. For pet containment applications, FIG. 9A illustrates a boundary by which a user has attempted to restrict a pet from a garden area 1000, but also attempted to allow the pet in a portion of the yard beside the garden area 1000 that is distant from the home. As seen in FIG. 9A, the desired boundary results in non-unique radial lines, as radial lines that extend to the distant corner by the garden area 1000 cross some of the flags 420, and therefore radial lines, that are proximate to the garden area 1000 and closer to the home. A similar problem may be encountered if the fence transmitter 130 were to be placed outside of a full boundary.

Figure 9B:
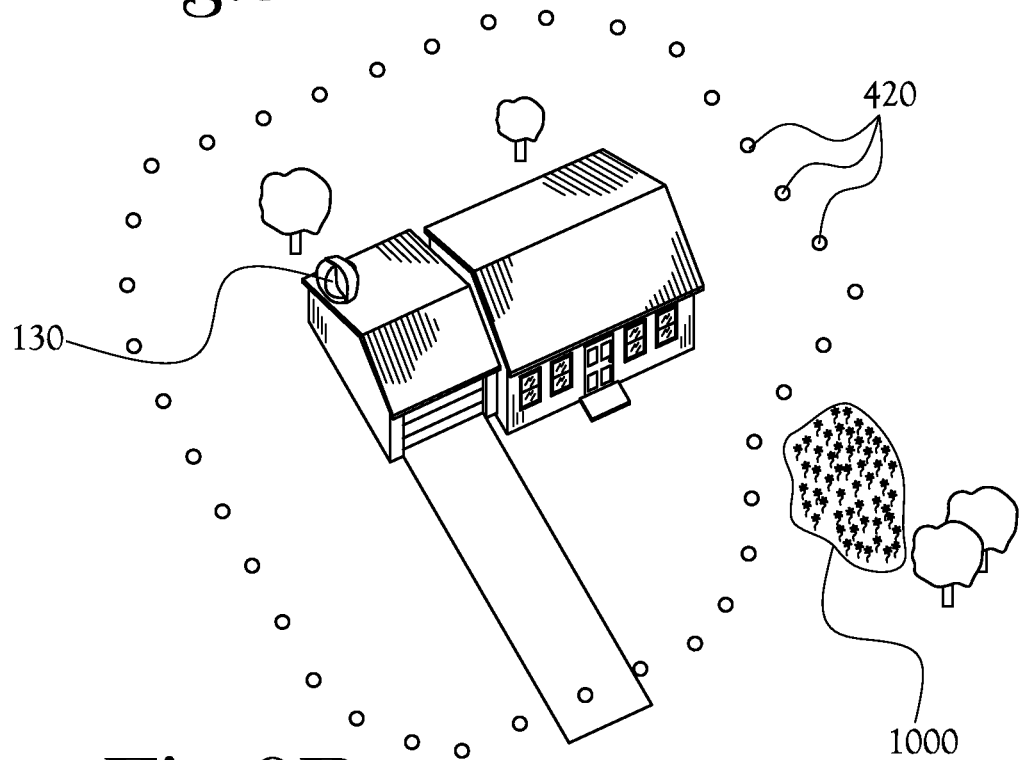

FIG. 9B illustrates a boundary by which the user has corrected the problem of non-unique radial lines by simply omitting the portion of the yard by the garden area 100 that caused the problem illustrated in FIG. 9A.

Figure 10A:
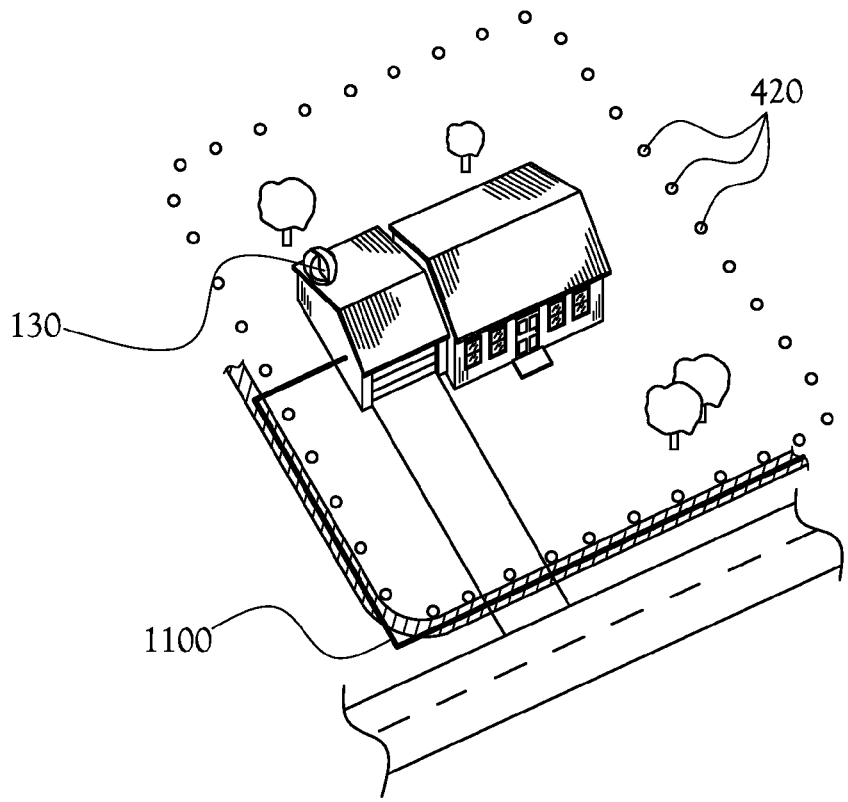
Figure 10B:
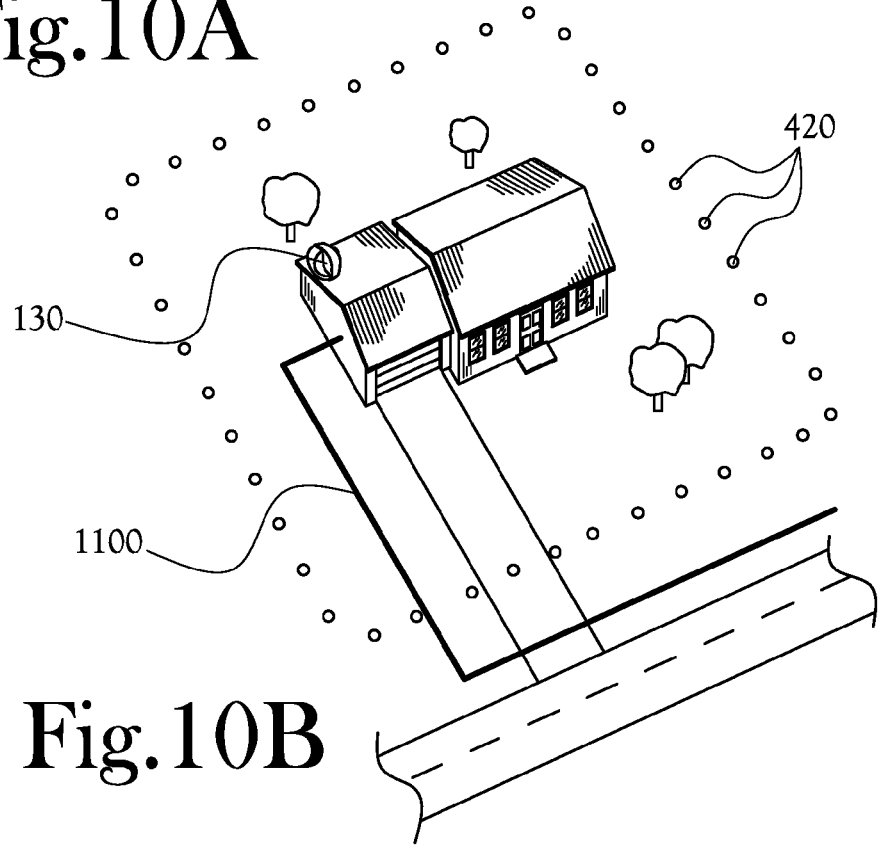

Likewise, a desired pet area which results in boundary flags placed too close to a buried utility line may be improved by simply moving the boundary flags inward away from the buried line. FIG. 10A illustrates a boundary by which a user has placed the boundary flags 420 that are very close to buried power lines 1100, and which run substantially parallel to the buried power lines 1100. Such placement may result in unwanted interference in the signal transmitted from the fence transmitter 130 when the receiver unit 120 is near these boundary points. FIG. 10B illustrates a boundary by which the user has corrected the buried power line problem by simply moving the boundary lines away from the buried power lines 1100. In some example embodiments, a distance of 15 feet may eliminate any potential interference from buried power lines, although different distances may be more or less desirable according to various example embodiments.

Figure 11A:
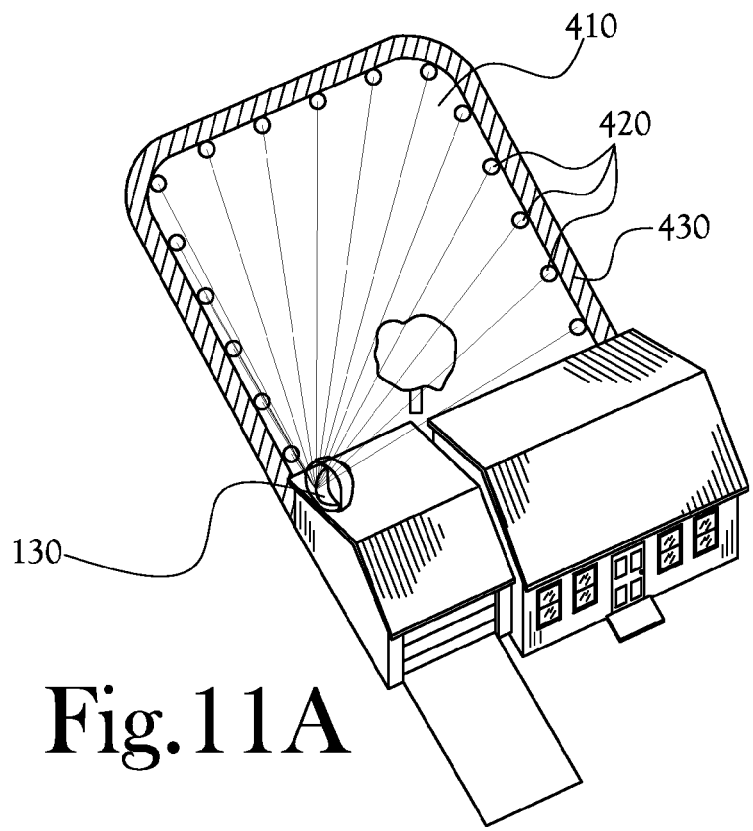
Figure 11B:
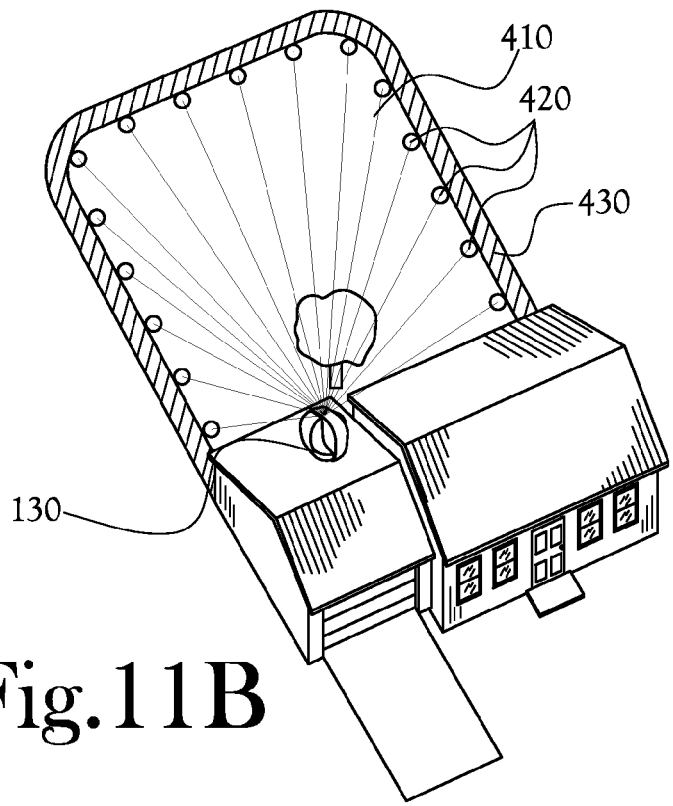

FIG. 11A illustrates a boundary by which the user has placed several of the boundary flags 420 along a line that extends from the fence transmitter 130, and thereby created a boundary in which several radial lines overlap one another. As these radial lines are obviously not unique, the receiver unit 120 will not be able to function properly by reading the information that is unique to a given distance along a unique radial line. FIG. 11B illustrates a boundary by which the user has corrected the problem of FIG. 11A by simply moving the location of the fence transmitter 130 so that the same boundary may be maintained, and unique radial lines are provided to each of the boundary flags 420.

As will be later described in more detail, these boundary flags 420 may be used in conjunction with the BPU 110 to define a boundary area 410 that is recognized by the receiver unit 120. In other various example embodiments, the area 410 may be defined using simply the receiver unit, boundary flags, and fence transmitter without the use of the BPU. In other words, in these other various example embodiments in which the BPU is not used, the receiver unit 120 may be provided with various processing and/or communication components, and in some cases even a graphical user interface, to allow the user to interact to evaluate and/or set boundary points to be recognized by the receiver unit.

According to various example embodiments of the present general inventive concept, a user may set the static correction level of the receiver unit 120 in various ways, such as setting the correction level using the mode button on the receiver unit 120, and setting the correction level using the BPU 110 while it is connected to the receiver unit 120. It is understood that these methods of setting the correction levels, as well as the quantity of levels, are merely examples, and a host of levels and methods of setting the static correction levels may be used. For example, a number of levels and corresponding strengths may be directly chosen through a graphical user interface provided on the BPU or receiver unit. For pet containment applications, an anti-linger prevention mode may be provided to discourage the pet from staying in the warning zone for long periods of time, and the time periods involved may be set according to different example embodiments of the desires of the user. Similarly, run-through prevention and over correction protection modes may be further applied to aid in the training and/or daily boundary enforcement for the pet.

Various example embodiments of the present general inventive concept provide a system setup mode to set/adjust various settings of the different components/operations of the boundary proximity determining system. For example, the system setup mode may be accessed by a user through a graphical user interface provided to the BPU 110 or other mobile processing device 310. In some example embodiments, the user may use the BPU 110 to choose the desired receiver unit correction level from a list of displayed options, to choose a desired width of the boundary's warning zone, to select whether the receiver unit 120 operates with a maximum correction range where a correction is automatically applied when range is measured to exceed a fixed threshold level, and so on. The user may access the BPU 110 to inform the receiver unit 120 when the fence transmitter has been switched to operate on a first or second possible transmission frequency, and reprogram the receiver unit 120 to operate on the corresponding transmitting frequency. The BPU 110 may display version information for the display software, the BPU processing software, the receiver unit software, and so on.

According to various example embodiments of the present general inventive concept, various different operations may be performed in preparation to programming the boundary area 410. As previously described, the BPU 110 may be provided with a display 111 and directional buttons 113 to allow a user to navigate menu choices to aid in these operations. Many features of the boundary defining system 100 may be customizable by the user through the BPU 110, such as the previously described correction level, warning zone width, maximum range correction, sleep mode, boundary status, and others. One example feature available to a user is a maximum range correction, which enables correction through the receiver unit when the receiver unit moves beyond the maximum fence transmitter range. Such a mode may be desirable in a situation such as when a user has defined a partial boundary including, for example, a back yard boundary extending from different sides of the back of a house. In other words, the partial boundary around the back yard may be set by the user through the BPU 110, and the physical structure of the house serves as a portion of the boundary not set by the user with the BPU 110. In such a situation, if a receiver unit leaves the house from the front door, there may be no boundary information stored in the receiver unit 120 which will correspond with the sensed magnetic field intensities and polarities encountered in the front yard, and thus no boundary corrections are issued by the receiver unit 120. In pet containment applications, the maximum range correction mode would offer a correction to the pet if the receiver unit 120 senses that the maximum range of the fence transmitter 130 is being approached, so that the pet would be discouraged from moving further away from the house.

In various example embodiments of the present general inventive concept, the receiver unit 120 may be programmed to stop sensing location values upon leaving the containment area 410 defined by the partial boundary. For example, in pet containment applications, if a pet is confined to a partial boundary around a backyard that begins and ends with flag locations at walls of the home, i.e., endpoints of the partial boundary, and the pet has left the bounded area by entering a doorway into the home, a user may wish to avoid a situation in which the pet could be erroneously corrected after entering the home due to extraneous signals and/or fields created by home appliances, and the like, that may interfere with the receiver unit's sensors. Thus, a user may wish for the receiver unit 120 to enter a disarm mode, or to be turned off, upon leaving the partial boundary area through a doorway of an adjacent home, or upon entering a home encompassed by a full boundary.

Various example embodiments of the present general inventive concept provide a receiver unit with information that such a partially bounded area has been left. As described in U.S. Pat. No. 7,656,291, each flag location used in programming the boundary has a unique radial line between the flag location and the transmitter, and the receiver unit may determine a current location by associating an angular dependent measurement to a particular flag location, and then determining a range factor to determine distance away from the flag location. Thus, as the receiver unit is able to determine substantially the location of the radial lines extending to the flags, and the corresponding distance along that line, by determining the current location, the receiver unit is able to determine when the outermost radial lines of the partial boundary have been crossed. In other words, the receiver unit is able to detect the crossing of the radial lines extending from the fence transmitter to the starting and ending flag locations. As such, the receiver unit may be programmed, such as through the BPU, to cease administering corrections after crossing over those outermost radial lines. Placement of the fence transmitter to a location proximate to the wall at which the two terminal flags of the partial boundary are located may improve this "turn-off" process, as such placement will allow the outermost radial lines to more closely run along the wall itself. In other various example embodiments, additional components may be provided to the system to cause the receiver unit to cease the corrective measures, or to be completely turned off, upon the dog passing a certain point, such as passing through the doorway into the home from a partial or full boundary area. For example, in pet containment applications, a remotely fixed or non-fixed button may be provided so that the user can simply disable the receiver unit upon observing the pet entering the home or other building or structure such as, for example, a shed, barn, doghouse, etc. As another example, one or more sensors may be provided at the doorway to sense the pet entering or leaving through the doorway, at which point a corresponding signal may be transmitted to the receiver unit to enable or disable the receiver unit's functions.

Figure 12:
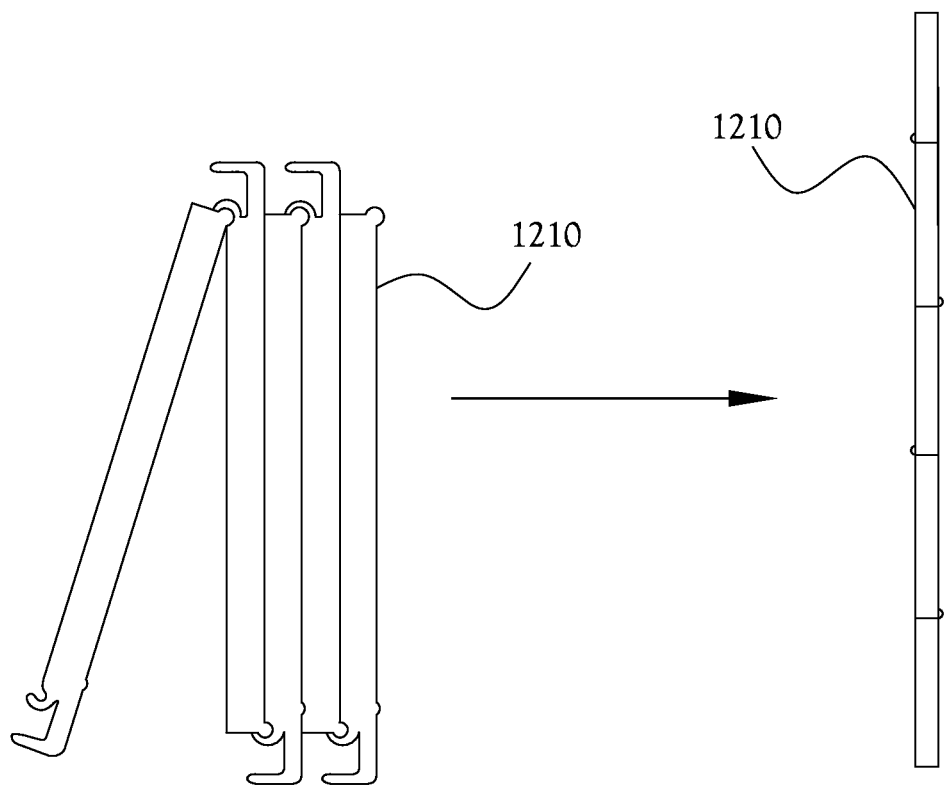
FIG. 12 illustrates a receiver handle on which the receiver unit of FIG. 1 may be mounted during a boundary defining operation according to an example embodiment of the present general inventive concept.

Various devices and operations which may be used and performed to prepare the receiver unit 120 for programming according to an example embodiment of the present general inventive concept will now be described in relation to FIGS. 12-14. FIG. 12 illustrates a receiver handle 1210 on which the receiver unit 120 may be mounted during a boundary defining operation according to an example embodiment of the present general inventive concept. As illustrated in FIG. 12, the receiver handle 1210 may be configured as a plurality of hinged sections that are lockable to form the fully assembled handle, to aid in easy storage and transportation of the receiver handle 1210 when not in use. By mounting the receiver unit 120 on the receiver handle 1210 during the boundary defining operation, the user is aided in maintaining a continuous height of the receiver unit 120 relative to the ground. The receiver unit 120 may be mounted at various heights on the receiver handle 1210 so as to more closely approximate the height of the receiver unit 120 when worn by a particular mobile subject for which the boundary is being determined.

Figure 13A:
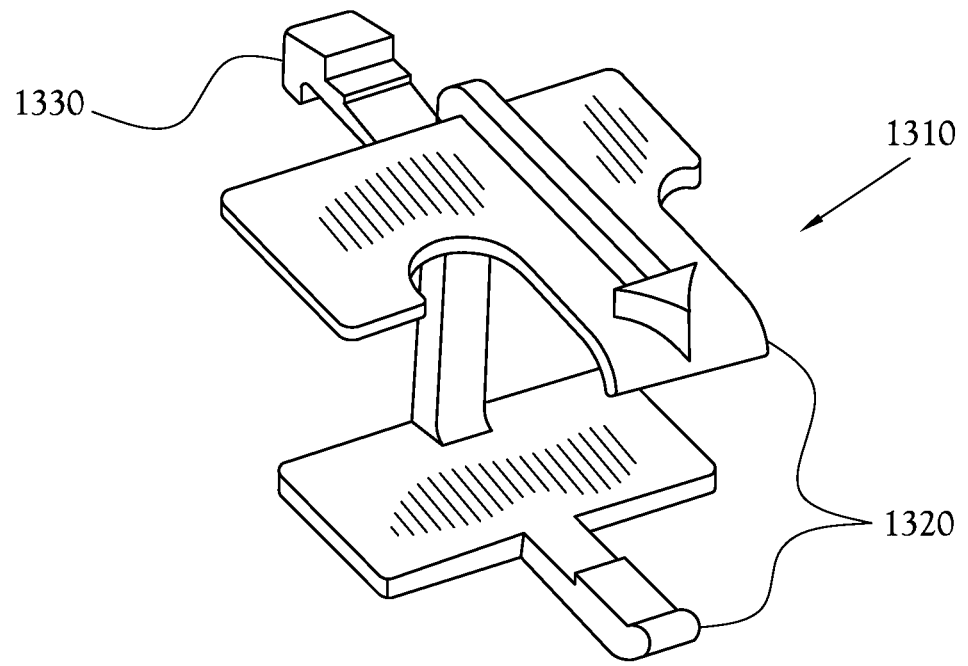
FIGS. 13A-13C illustrate a receiver mounting bracket 1310 and mounting operation that may be used to mount the receiver unit onto the receiver handle of FIG. 12 according to an example embodiment of the present general inventive concept.
Figure 13B:
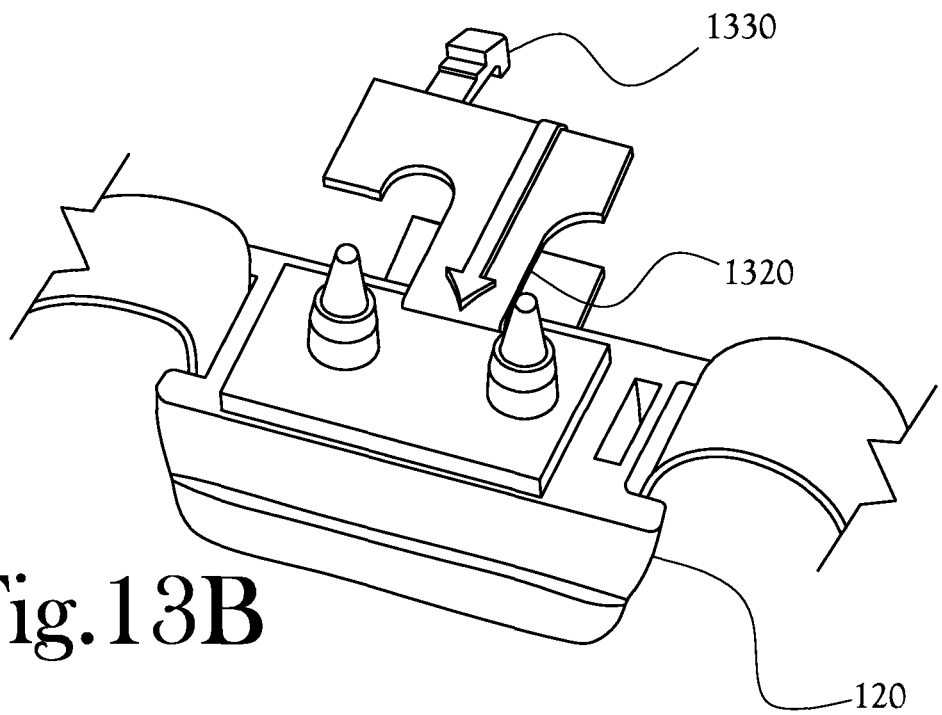
Figure 13C:
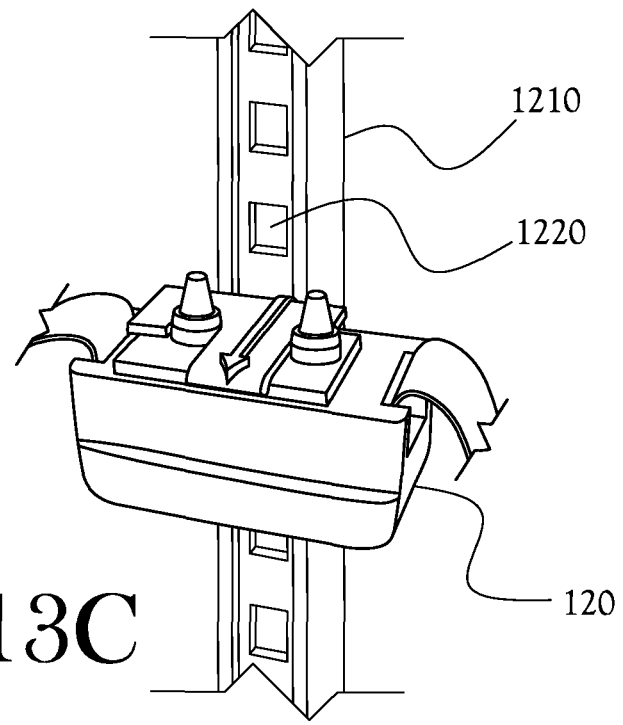

FIGS. 13A-13C illustrate a receiver mounting bracket 1310 and mounting operation that may be used to mount the receiver unit 120 onto the receiver handle 1210 of FIG. 12 according to an example embodiment of the present general inventive concept. As illustrated in FIGS. 13A-C, the receiver mounting bracket 1310 may include two clasping portions 1320 extending from the receiver mounting bracket 1310 such that the receiver unit 120 may be accommodated and held firmly in the clasping portions 1320. According to various example embodiments, the clasping portions 1320 may be formed so as to be semi-rigid to selectively secure and release the receiver unit 120, or in a hinged configuration with a resilient member biasing the clasping portions 1320 toward a clasped position, or any of a host of other known clasping configurations. The receiver mounting bracket 1310 may be provided with one or more handle clips 1330 configured to be accommodated by corresponding clipping apertures 1220 provided to the receiver handle 1210. After fixing the receiver unit 120 to the receiver mounting bracket 1310 as illustrated in FIG. 13B, the receiver mounting bracket 1310 may be coupled to the receiver handle 1210 at a height that corresponds to the height at which the receiver unit 120 will be worn by the mobile subject for which the boundary is being determined in order to more accurately sense the magnetic field characteristics, e.g., angular, intensity, polarity, range, as will be encountered during normal operation.

Figure 14:
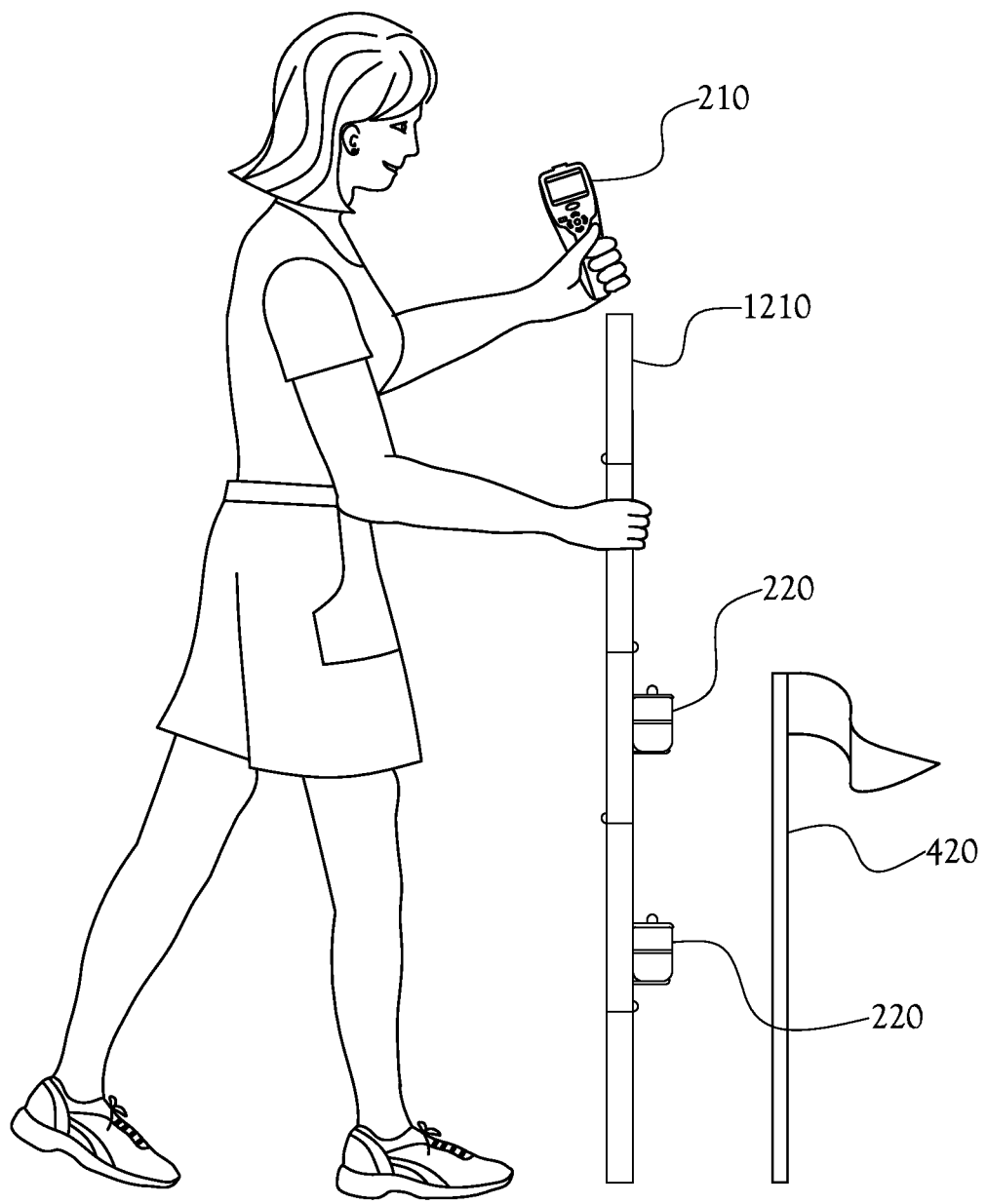
FIG. 14 illustrates an example of a user employing the components illustrated in FIGS. 2, 12, and 13A-13C according to an example embodiment of the present general inventive concept.

FIG. 14 illustrates an example of a user employing the components illustrated in FIGS. 2, 12, and 13A-13C according to an example embodiment of the present general inventive concept. In the example embodiment of FIG. 14, the user is programming two different receiver units 220 at the same time, the different receiver units 220 being placed at different heights on the receiver handle 1210 according to the respective heights at which the receiver units 220 will be located when worn by the two respective pets or other hosts. While the example embodiment of FIG. 14 is illustrated as including a wireless connection between the BPU 220 and receiver units 220, it is understood that various other example embodiments may include a wired connection, a wirelessly connected mobile processing device 310, or the like.

As previously discussed, in some embodiments of the present general inventive concept the BPU 110 can be connected through a wired connection to the receiver unit 120 during the boundary setting operations, but a wireless connection, such as BLUETOOTH®, or other known or later developed wired or wireless transmission techniques may be provided without departing from the broader scope and spirit of the present general inventive concept. In other various example embodiments, the receiver unit 120 itself may be provided with the circuitry, programming interface, etc., such that the programming of the boundary points may be performed with the BPU 110. In still other various example embodiments, software and/or hardware modules may be provided to another data processing device, such as a smart phone, laptop, tablet, PC, or other known or later developed computational devices to perform some or all of the operations described as being performed in these example embodiments.

According to various example embodiments of the present general inventive concept, a plurality of preliminary operations may be performed to test a boundary layout before actually programming the boundary of the desired area. Various example operations performed in the testing of the layout may include positioning the fence transmitter 130 substantially near the point at which the fence transmitter 130 is to be installed, and providing power to the fence transmitter 130. "Corner" flags may be placed at minimum and maximum distance points of the desired boundary, which, in one example embodiment, may be respectively 15 feet and 90 feet. With the receiver unit 120 in electrical communication with the BPU 110, the corner flags may be tested by placing the receiver unit 120 (mounted on the previously described receiver handle 1210 to approximate the receiver unit height) to determine whether the flag location is acceptable. In various example embodiments, the BPU 110 may automatically enter the test mode upon being turned on. If the point at which a flag is tested is acceptable, the BPU 110 will indicate that the flag location is good, and may provide an approximate range measurement. If the flag location is not acceptable for one or more detected reasons, the BPU 110 may indicate that the position is not acceptable, and in some example embodiments may display a message indicating why the location failed. Examples of why a flag location may not be acceptable may include, for example, being too far from the fence transmitter 130, in an area of high signal distortion, and so on.

In various example embodiments of the present general inventive concept, the BPU 110 may be configured to perform in a test mode to pre-test the suitability of any individual flag location before the field information corresponding to the boundary flags 420 are evaluated and entered. The receiver unit 120 may be held still at the location of the boundary flag 420 to be tested while one or more types of the field characteristic data, such as radio signal intensities and polarities, is acquired. The user may be informed by the BPU 110, for example by visual and/or audible indicators, that the location is acceptable, and the approximate distance from the fence transmitter 130 may be indicated. Similarly, the user may be informed by the BPU 110 that the location is not acceptable for any of a variety of reasons. For example, the BPU 110 may indicate to the user that the maximum range from the fence transmitter 130 has been exceeded. Such a testing mode may be desirable for quickly pre-testing points on a candidate boundary to determine if the desired boundary points fall within the proper range, if the signals are distorted by outside forces, and so on. The process may be repeated for each "corner" flag in the candidate boundary, or any other boundary flags 420 that the user wishes to pre-test.

Various operations may be performed in a boundary scan mode, which is performed before the programming of a desired boundary, according to example embodiments of the present general inventive concept. Such a boundary scan mode may provide a more comprehensive check, compared to the previously described boundary flag test, for buried wires or other possible causes of interference that may require the adjustment of the boundary and/or the fence transmitter 130 location. More particularly, the boundary scan performed in the boundary scan mode may identify regions of poor signal quality, or regions where the magnetic fields generated by the fence transmitter 130 are distorted by interfering fields that will likely cause poor boundary detection performance by the receiver unit 120. Using the boundary scan mode, the user can quickly scan a candidate boundary for possible problems before going through the full task of programming all of the flag points of the boundary into the receiver unit 120. If problems are encountered during the boundary scan, the scanning process can be quickly repeated after one or more boundary and/or fence transmitter 130 location adjustments are made by the user. As the user moves through the areas to be scanned, the user may receive audible (such as a change in a beeping pattern) and/or visual (such as a displayed bar graph) indications from the BPU 110 at areas having poor signal qualities. In addition to this described boundary scanning, in various example embodiments the boundary scan mode may be used to scan all parts of a candidate containment area to locate any pockets of poor signal quality that might affect system performance when the receiver unit 120 is not near the actual boundary.

In various example embodiments of the boundary scan test, the user may select the boundary scan mode from a main menu of the BPU 110. Starting at the point at which the first boundary flag 420 is, or will be, placed, the user may walk the entire boundary, for example, in a clockwise direction, around the fence transmitter 130. The user may listen for a change in emitted tones and/or visual cues indicated by the BPU 110 while moving around the boundary. For example, in various embodiments the BPU 110 may emit a change in tone from a steady tone to a more rapid tone if a user moves through a problem area. In other various example embodiments, a visual display on the BPU 110 may indicate whether locations are good or bad as the user moves through the various locations. For example, the visual display may include a bar graph having values of 0 to 10 indicating the strength of the characteristics sensed from the fields transmitted by the fence transmitter 130. In such an example embodiment, a user may wish to avoid setting boundary flags 420 in scanned areas resulting in number readings of 0 to 3 for more than 10 feet, as interference may be experienced in those locations. In such as case, the user may consider adjusting the boundary, and/or moving the fence transmitter. If a trial location proves to provide a successful boundary point, then the fence transmitter 130 may be more permanently secured prior to programming a more exact final boundary.

After scanning and determining the boundary area to be acceptable, the user may place the boundary flags 420 along the determined boundary for storage of the boundary flag 420 locations. The user may wish to place the first boundary flag 420 at the start of a partial boundary, or anywhere on a full boundary, and move around the boundary, for example, in a clockwise fashion. In various example embodiments, the user may wish to place the boundary flags 420 such that each boundary flag 420 has an uninterrupted radial line to the fence transmitter 130. In other words, other boundary flags 420 should not lie on the radial line established by any one boundary flag. As one example embodiment of the present general inventive concept in which a full boundary is to be programmed, the maximum number of boundary flags 420 the system can accept may be 128, and the minimum number of boundary flags may be 40. In an example embodiment in which a partial boundary is to be programmed, the minimum number of flags may be 10. In various example embodiments, the minimum distance between boundary flags 420 and the fence transmitter 130 may be 15 feet, and the maximum distance may be 90 feet. In various example embodiments, the spacing between boundary flags located within 30 feet of the fence transmitter 130 may be 3 feet apart, the spacing between boundary flags located between 30-70 feet of the fence transmitter 130 may be 4 feet apart, and the spacing between boundary flags located greater than 70 feet from the fence transmitter 130 may be 4-5 feet apart. It is understood that these are simply example parameters of various example embodiments, and the present general inventive concept is not limited to any such quantities and/or distances.

Various operations associated with the installing of the fence transmitter 130 may be performed according to different example embodiments of the present general inventive concept. While some example embodiments of the fence transmitter 130 may call for procedures such as mounting the fence transmitter 130 on a vertical, non-metallic surface inside a protected area, other various example embodiments may provide different options and capabilities for mounting the fence transmitter 130. For example, various embodiments of the present general inventive concept may provide a weatherproof housing for the fence transmitter 130 to be placed outside, or as a decorative figure, and so on. As the location of the fence transmitter 130 is part of the calculations of the boundary, any movement of the fence transmitter 130 from the point occupied during the testing and establishing of the boundary may have an effect on the operation of the boundary characteristics sensed by the receiver unit 120.

Various operations associated with programming the boundary according may be performed according to various example embodiments of the present general inventive concept. After a user has conducted the previously described boundary tests and/or scan modes, and installed the fence transmitter 130, the boundary may be programmed into the receiver unit 120. After the user has placed the appropriate number of boundary flags 420 around the desired full or partial boundary, the program boundary mode may be used to sequentially acquire location data at each boundary flag 420. In various example embodiments, the user may couple the BPU 110 to the receiver unit 120 such that the BPU 110 is in electrical communication with the receiver unit 120. Upon turning the BPU 110 on, a display on the BPU 110 may display various functions as a set-up guide to instruct the user on proper boundary programming methods. According to various example embodiments of the present general inventive concept, such methods may include moving in a clockwise direction to the next adjacent boundary flag 420 after entering boundary information about a current boundary flag 420, observing designated flag spacing and maximum flag count, pointing an arrow provided on the receiver unit holder 1310 away from the fence transmitter 130 during the programming, and so on.

While most of the example embodiments described thus far include the handheld BPU 110, various other example embodiments may include the use of other processing devices 310, such as a smartphone or other computational device, in lieu of the BPU. For example, a user may equip a smartphone with a program that causes the smartphone to communicate with the receiver unit 220 to process, store, and/or indicate to the user the various values used in programming the boundary. Moreover, the BPU 110 or other device may enable the user to back-up the boundary information on an external database or other storage device such as, for example, online cloud services or other backup or data storage systems. Such a program may cause the smartphone to display a graphical user interface to the user to manipulate the various controls that may be available to the BPU 110 of the previously described examples, and may be in wired or wireless communication with the receiver unit 120. Additionally, hardware components may be coupled to the smartphone to provide similar field sensing capabilities as possessed by the receiver unit 120 in various example embodiments, such that the field characteristics described herein as being detected by the receiver unit 120 may be detected by the smartphone itself. Similarly, in various example embodiments of the present general inventive concept, the receiver unit 220 equipped with a transceiver or other communication unit may transmit detected and transmit field properties to a remote processing device for processing of the location and whether to provide a corrective stimulus for pet containment applications. In other words, in such an example embodiment, rather than the receiver unit 220 performing the processing of the measured data to determine the location of the receiver unit the receiver unit 220 may simply transmit the measured data to a processing device such as, for example, a PC, which processes the field data to determine whether the currently location of the receiver unit is a permissible location, and then transmits a signal back to the receiver unit 220. For pet containment applications, this signal can be used to provide a corrective stimulus to the pet in the case in which the pet is in, or approaching, a forbidden area. Since such location processing is performed remotely from the receiver unit 220 in such an example embodiment, hardware otherwise provided to the receiver unit 220 may be eliminated or reduced in size so that the receiver unit 220 may be smaller and more lightweight, and/or require less power to function.

In various example embodiments of the present general inventive concept, after the user has chosen the program boundary mode from the options presented by the BPU 110, the BPU 110 may then prompt the user to select which boundary type, e.g., full or partial boundary, is to be programmed. The BPU 110 may also query the user as to whether any previously stored boundary flags 420 are to be re-used, and allow the user to select how many boundary flags 420 are to be re-used. By numbering the boundary flags 420 sequentially before/during the programming of the boundary, the boundary flag numbers of previously stored boundary flags 420 may serve as an easy way to reference such boundary flags 420 that are to be re-used. In the event that the user does wish to re-use previously stored boundary flags 420, and indicates as such to the BPU 110, the BPU 110 may allow the user to select how many boundary flags 420 are to be re-used. Such re-use of previously stored boundary flags 420 is useful in cases such as when the user needs to re-program only part of the boundary, or if the original programming process was interrupted before all of the boundary flags' 420 information was acquired, and so on.

After such queries have been answered and the corresponding selections have been made, the user may begin programming the boundary by moving the receiver unit 120 to the first boundary flag 420. While pointing the arrow on the receiver mounting bracket 1310 in a direction away from the fence transmitter 130, the user causes the BPU 110 to program the receiver unit 120 to store the sensed qualities of that spot as indicators of a boundary location. The user may simply follow the prompts provided by the BPU 110 to acquire this boundary data. In various example embodiments, as in the boundary test mode, the range may be displayed in response to the boundary flag 420 location being accepted, and the user may be advised that the boundary flag 420 is accepted and be prompted to move to the next boundary flag 420. Otherwise, an error menu may indicate what caused the boundary flag location to fail, and the user may be advised to attempt another location for the boundary flag 420. For example, if a maximum range is exceeded, the BPU 110 may indicate through the display that the boundary flag position is not acceptable due to being out of range.

After acquiring/storing the acceptable boundary flag position information, the user may move to the next adjacent boundary flag 420 and continue to acquire the information corresponding to each boundary flag 420 sequentially, for example in a clockwise or counter-clockwise fashion. The BPU 110 may display a flag index number that corresponds with the boundary flag 420 for which the information is being acquired. The BPU 110 may remind the user at one or more of the boundary flags 420 of various information, for example, that the arrow on the receiver mounting bracket 1310 should be facing in a direction away from the fence transmitter 130, that the user should proceed in a clockwise fashion to the next adjacent boundary flag 420, and so on.

According to various example embodiments, data from each boundary flag 420 acquisition may be processed to determine if the current boundary flag 420 is placed too far from the previous boundary flag 420. In other words, the data may be analyzed to determine if there is excessive flag-to-flag spacing. If the maximum spacing is exceeded, the acquisition may not be accepted, and the user may be guided through the process of moving the current boundary flag 420 closer to the previous boundary flag 420, and then repeating the acquisition. Data from each boundary flag 420 acquisition may be processed to determine if the arrow on the receiver unit bracket 1310 is not consistently pointing away from the fence transmitter 130. If the BPU 110 detects that the arrow is not pointing in the correct direction, the user may be prompted by the BPU 110 to take corrective action. Various example embodiments may provide an error menu on the display 111 of the BPU 110 to indicate one or more reasons that the boundary flag 420 location is not suitable for data acquisition.

After the acquired data has been accepted for a boundary flag 420 location, the user may be queried by the BPU 110 as to whether there are any more boundary flags 420 for which data is to be acquired. If the user chooses an option through the BPU 110 indicating that no more boundary flag 420 locations are to be acquired, the user may be prompted by the BPU 110 to acquire data at an easily recalled reference point. The reference point chosen by the user should be easily remembered and relatively permanent, e.g., a corner of a sidewalk or driveway. In some example embodiments, the reference point may need to be located 20 to 80 feet from the fence transmitter 130. The chosen reference point may be used to add multiple receiver units 120 to the system, which will be discussed in more detail herein. Once the user has chosen the reference point, and has correctly positioned the receiver unit 120 at the reference point, the BPU 110 may perform the data acquisition for the reference point in the same fashion as performed for each of the boundary flag 420 locations. In response to the reference point data acquisition being accepted, the user may be informed that the BPU 110 has automatically started an internal boundary calculation process which may take several minutes to complete. If the boundary calculation is not successfully completed, the user may be advised of such via the BPU display 111, and further may be advised as to how to respond to the system failure. During the boundary calculation process that is being performed by the BPU 110, the user may leave the area contained by the boundary, but the BPU 110 should remain in communication with the receiver unit 120 until the BPU 110 indicates that it is acceptable to disconnect the BPU 110 from the receiver unit 120. If the process is completed successfully, the user may be informed by the BPU display 11 that the receiver unit 120 programming process, which includes downloading the processed boundary data from the BPU 110 to the receiver unit 120, has been completed, and that the BPU 110 can be disconnected from the receiver unit 120. Also, the display 111 may indicate the status of the programming process during the operation thereof.

Various operations may be performed to set the warning zone 430 according to example embodiments of the present general inventive concept. After the boundary data has been programmed, the user may use a menu displayed by the BPU 110 to set the width of the warning zone. In an example embodiment, the warning zone may have a minimum width of 1 foot, and a maximum width of 5 feet. However, different ranges may be available according to different example embodiments. The user may set/adjust the warning zone width by connecting the BPU 110 to the receiver unit 120, selecting system settings from a displayed menu, and setting the warning zone width through the user interface. Various example operations may be available to test the warning zone. For example, with the receiver unit 120 on the receiver handle 1210, the user may approach the boundary flags 420 from inside the boundary area 410 and observe whether a warning tone is emitted as a boundary flag 420 is approached. Moving past the boundary flag 420 may generate a different indicator, such as, for example, three distinct warning tones, to indicate a run-through stimulation level. For pet containment applications, the user may also walk around various points inside the boundary area 410, particularly around AC power, cable television, and phone line entrances into the home, and near air conditioning units, to make sure that the receiver unit 120 does not emit the warning tones in areas that are designated as safe for the animal. If problems in such areas are encountered, the layout of the boundary may need to be adjusted to exclude these areas, or the fence transmitter 130 may be moved and the boundary flags 420 re-acquisitioned, and so on.

Various example embodiments of the present general inventive concept may also include a component of an electronic animal training system such as an ADD-A-DOG® mode which may be used to program additional receiver units 120 to operate with a boundary that has been previously established, such as in the operations described above. After connecting the BPU 110 to the new receiver unit 120, the user may be instructed to acquire data at the same reference point that was used during the programming of the initial receiver unit 120. Upon successful data acquisition at the reference point, the BPU 110 may indicate to the user that the programming of the boundary into the new receiver unit 120 is automatically being executed. Since the BPU 110 has measured the reference point with both the old and new receivers 120, the BPU 110 may compute and apply a calibration factor during the programming of the new receiver unit 120 so that both the old and new receiver units 120 will recognize the same boundary, even though the two different receiver units 120 may have slightly or significantly different measurement sensitivities due to different manufacturing tolerances, elements, etc.

Figure 15:
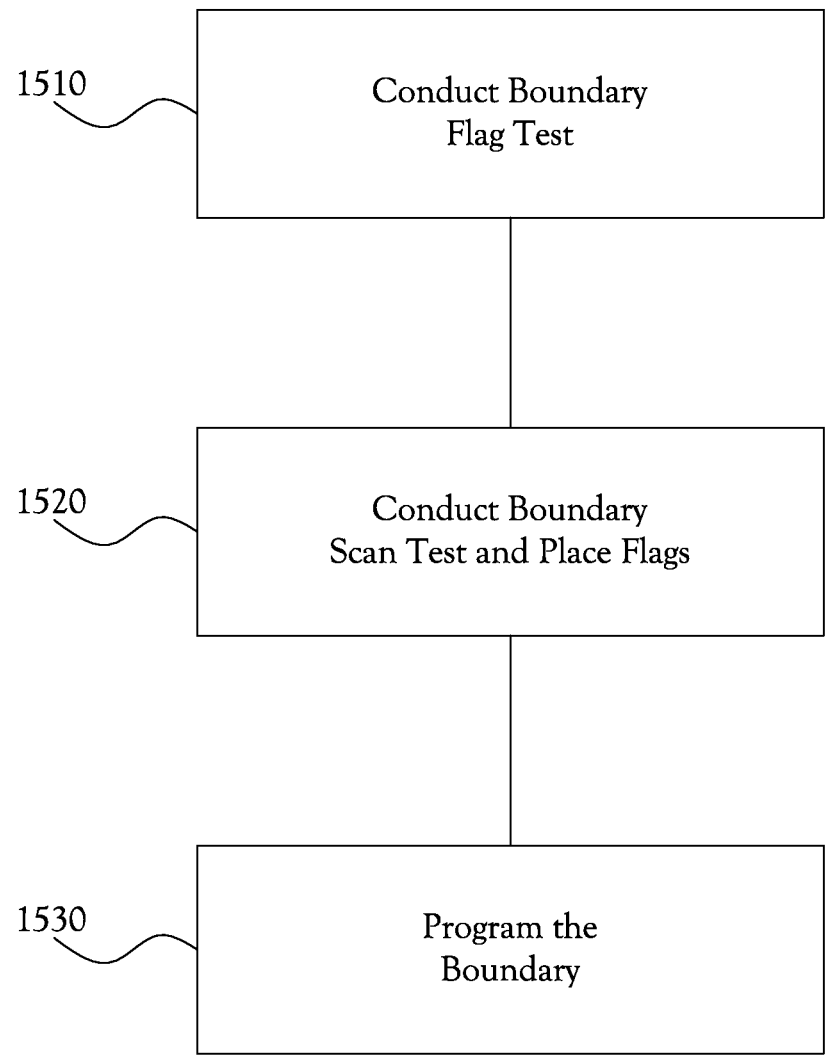
FIGS. 15-19 are flow charts illustrating various operations which may be used to perform methods of boundary assessment/programming according to example embodiments of the present general inventive concept.

FIGS. 15-18 are flow charts illustrating various operations which may be used to perform methods of boundary assessment/programming according to example embodiments of the present general inventive concept. FIG. 15 illustrates three phases of operations that may be performed from the initial boundary planning through the programming of the receiver unit. For example, in operation 1510, the user may begin conducting a boundary flag test to test potential locations of one or more boundary flag locations of interest. In operation 1520, the user may conduct a boundary scan test and place the boundary flags at the acceptable boundary flag locations. In operation 1530, the user may program the boundary information into the receiver unit. It is noted that this example has listed these operations in order, but one or more of these operations may be omitted, repeated, or otherwise performed in different orders according to various example embodiments of the present general inventive concept. More detailed descriptions of these operations will be described in the discussion of FIGS. 16-18 below.

Figure 16:
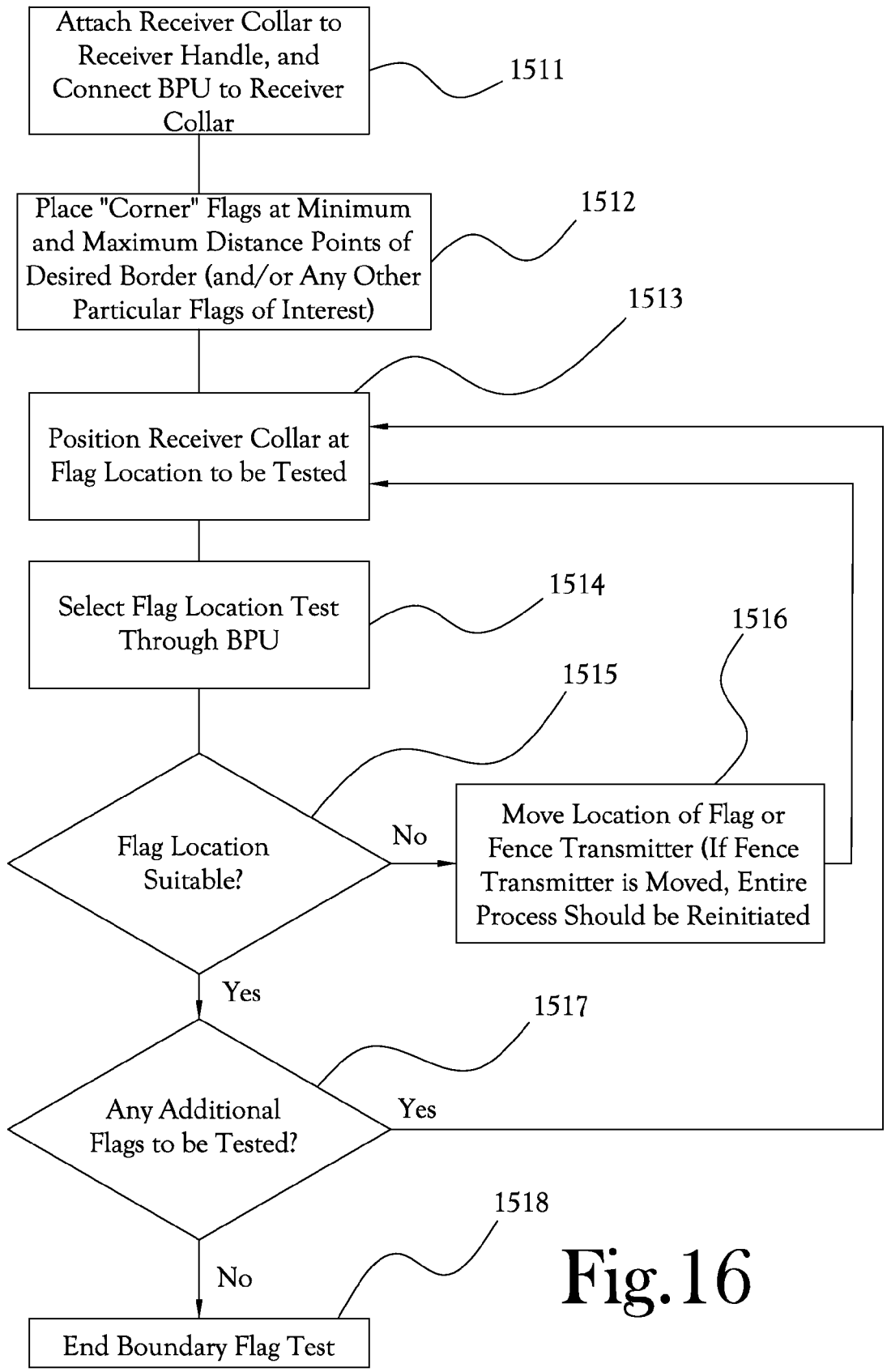

FIG. 16 illustrates operations that may be included in the boundary flag test 1510 of FIG. 15. In operation 1511, the user may prepare for the boundary scan test by attaching the receiver unit, which in the illustrated embodiment is a receiver collar to be worn by the pet, to the receiver handle at approximately the height at which the receiver unit will be attached to the animal, and connecting the BPU to the receiver unit so as to be in electrical communication with the receiver unit. In operation 1512, the user may place "corner" flags at minimum and maximum distance points of the desired boundary, as well as any other particular boundary flags of interest, to assess the suitability of these particular boundary flags before testing the entire desired boundary. In operation 1513, the user may position the receiver handle mounted receiver unit at the first boundary flag location to be tested, and may select the flat location test mode through the BPU in operation 1514. In operation 1515, the BPU may assess the suitability of the boundary flag location through the field characteristics detected by the receiver unit, and indicate to the user through a visual and/or audible cue whether the boundary flag location is suitable. If it is determined that the boundary flag location is suitable to be included in the boundary, in operation 1517 the BPU may query the user as to whether any additional boundary flag locations are to be tested, and may end the boundary scat test mode in operation 1518 in response to the user entering through the user interface that no additional boundary flag locations are to be tested. If the user indicates through the user interface that additional boundary flags are to be tested, in operation 1513 the BPU may prompt the user to again position the receiver unit at the boundary flag location to be tested. If the boundary flag location is determined to not be suitable in operation 1515, due to being out of range of the fence transmitter and/or other detected problems, the BPU may prompt the user in operation 1516 to move the location of the boundary flag or the fence transmitter, and return to operation 1513. It is noted that if the fence transmitter is moved to aid the suitability of the boundary flag location, any of the previously tested boundary flag locations may be tested again to verify their suitability with the repositioned fence transmitter.

Figure 17:
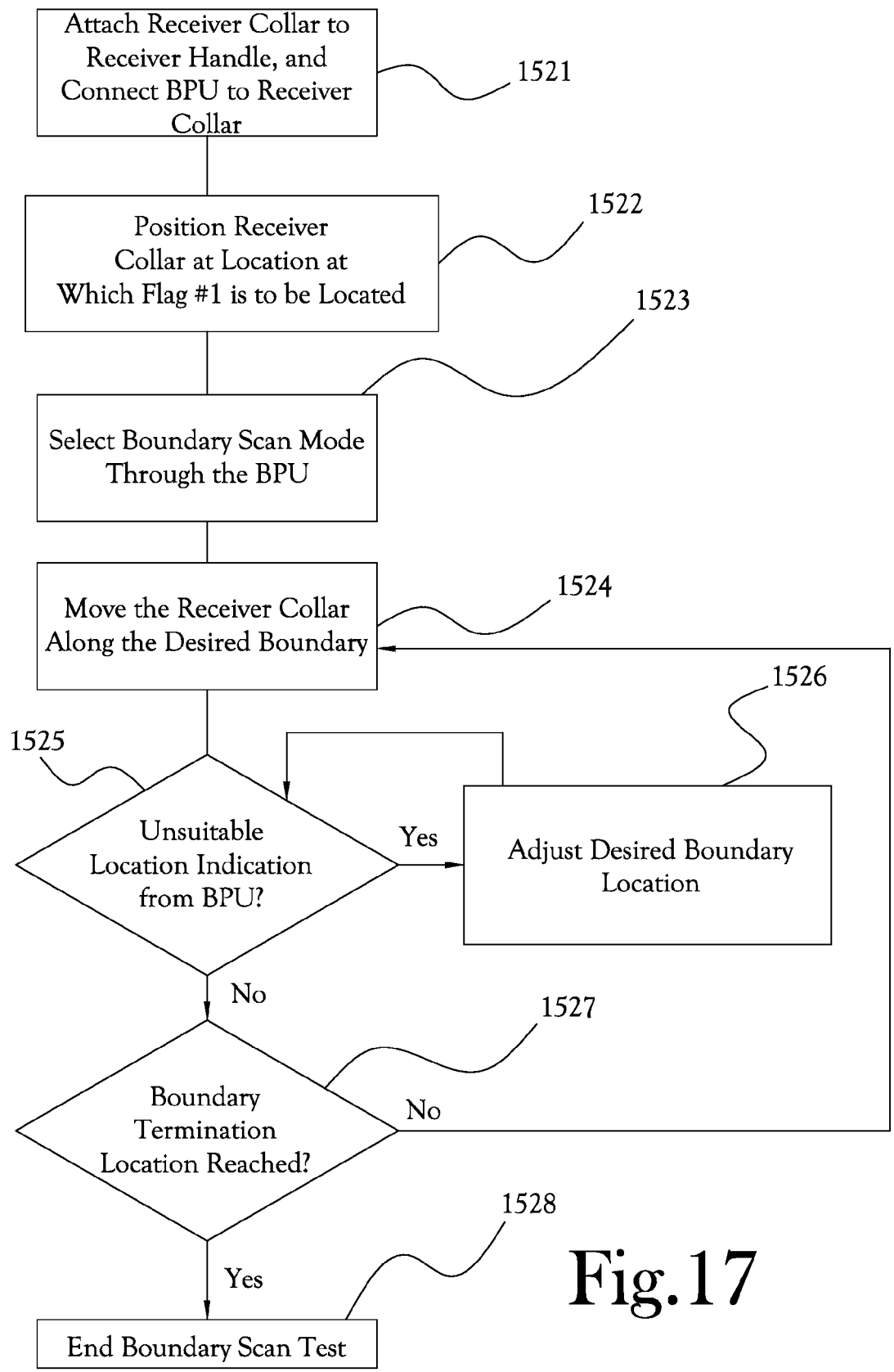

FIG. 17 illustrates operations that may be included in the boundary scan test 1520 of FIG. 15. As previously described, in operation 1521 the user may attach the receiver unit to the receiver handle, and connect the BPU to the receiver unit. The user may then position the receiver unit at the location at which boundary flag #1 is to be located in operation 1522. As previously described, the receiver unit can be positioned facing away from the fence transmitter when testing the boundary flag locations. In operation 1523 the user may select the boundary scan mode through the BPU. After selecting the boundary scan mode, in operation 1524 the user may begin moving the receiver unit along the desired boundary, during which movement the BPU analyzes the field characteristics detected by the receiver unit to provide an assessment of the suitability of the boundary at many or all points along the boundary. In operation 1525, the BPU may provide a constantly or frequently changing indication to the user as to whether the current receiver unit position is suitable to be included in the boundary line. For example, the BPU may display a graph indicating field characteristic detection strength between values of 0 and 10, and readings from 0 to 3 may indicate that the current position is unsuitable due to signal interference or the like. If the BPU indicates that the current location is unsuitable for the boundary line in operation 1525, the user may adjust the desired boundary location in operation 1526 by moving the receiver unit to a new position along the adjusted boundary line, at which point the BPU will repeat the suitability determination of operation 1525. Different points/lines may be evaluated until a suitable boundary line is determined. In operation 1527, if the boundary termination location is determined to have been reached, such as by the user pressing an end test button through the user interface to the BPU, the boundary scan test mode can be terminated in operation 1528. If the boundary termination location has not been reached, the user may continue to move the receiver unit as in operation 1524. The user may place the boundary flags, which may be numbered sequentially from the starting point to the termination point, during the assessment of the boundary. The user may also place the boundary flags before the boundary scan test, but it may be possible to move one or more of the boundary flags in the event that the boundary flag locations are determined to be unsuitable for a particular boundary line or area.

Figure 18:
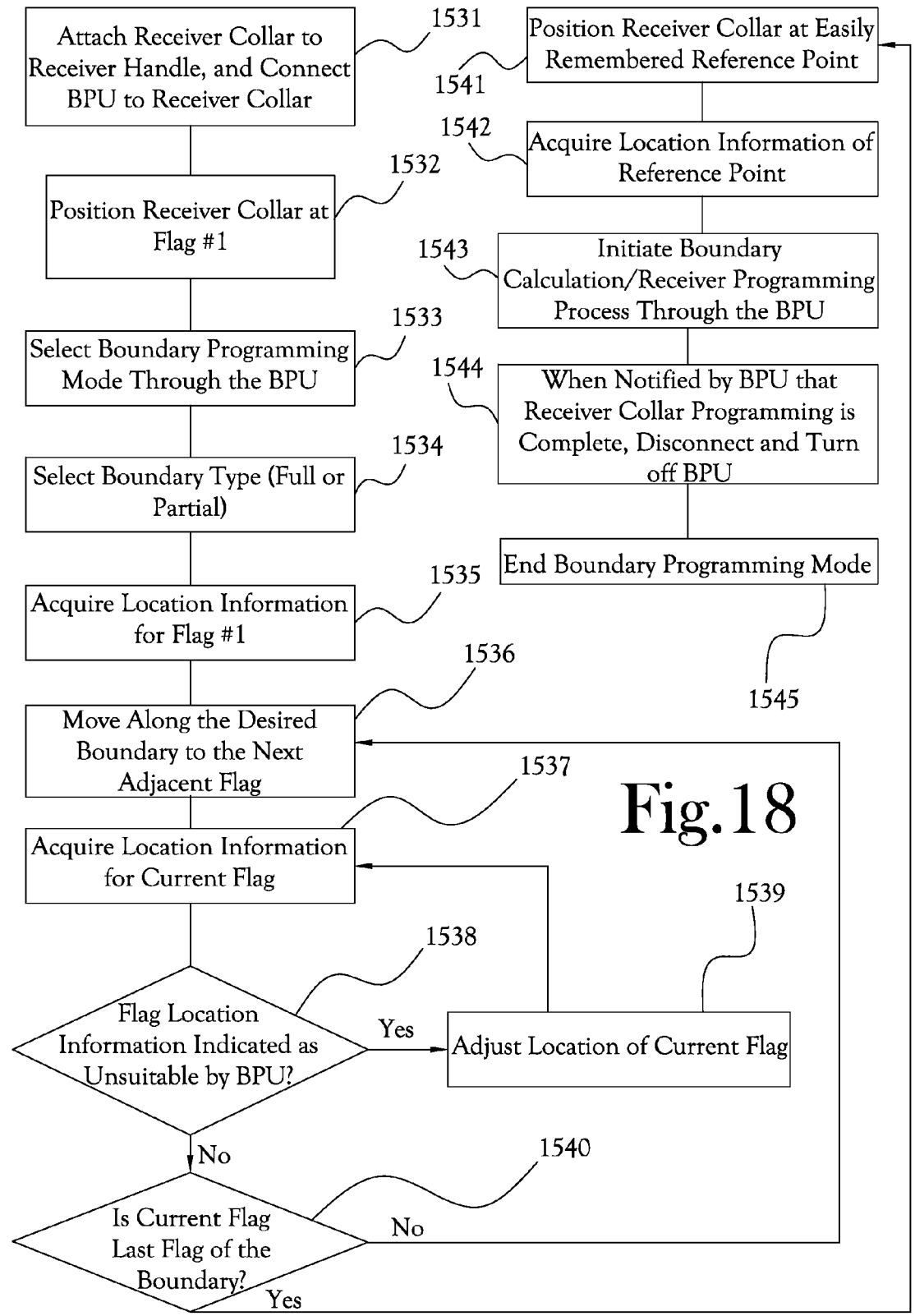

FIG. 18 illustrates operations that may be included in the boundary programming 1530 of FIG. 15. As previously described, the user may attach the receiver unit to the receiver handle, and connect the BPU to the receiver unit in operation 1531. In operation 1532, the user may position the receiver unit at boundary flag #1, the position of which may have already been evaluated during the boundary flag test and/or boundary scan. In operation 1533, the user may select the boundary programming mode through the user interface of the BPU, and may select the boundary type (full or partial) in operation 1534. In operation 1535, the user may prompt the BPU to acquire location information for boundary flag #1, at which point the BPU may associate the field characteristics currently detected by the receiver unit with that boundary flag #1 such that the receiver unit will recognize those conditions as indicating a boundary point location after the programming is complete. In operation 1536, the BPU may prompt the user to move to the next sequentially numbered boundary flag, and the user will move to the next adjacent and sequentially numbered boundary flag, for example in a clockwise fashion. In operation 1537, the BPU may acquire location information for the boundary flag at which the receiver unit is currently located in the same fashion as in operation 1535. In operation 1538, the BPU can determine whether the field characteristics currently detected by the receiver unit are suitable for the current boundary flag location. If it is determined in operation 1438 that the boundary flag location is not suitable, in operation 1539 the BPU may prompt the user to adjust the location of the current boundary flag, upon which adjustment the BPU will be returned to operation 1537 to newly acquire the location information of the boundary flag. It is noted that the analysis of whether the acquired location information is suitable for the current boundary flag location may also be performed for boundary flag #1, but has been omitted from this illustration for the sake of clarity. If it is determined in operation 1538 that the boundary flag location information for the current boundary flag is suitable for the desired boundary, the BPU may query the user as to whether the current boundary flag is the last boundary flag of the boundary line. If the user indicates to the BPU that the current boundary flag is not the last boundary flag of the boundary, the BPU may return to operation 1536 and prompt the user to move to the next sequentially numbered boundary flag, for example in a clockwise fashion. If the user indicates to the BPU in operation 1540 that the current boundary flag is the last boundary flag of the boundary, the BPU may then prompt the user in operation 1541 to position receiver unit at an easily remembered reference point, such as the corner of a sidewalk, and the location information of the reference point will be acquired in operation 1542. Upon the location information of the reference point being acquired, in operation 1543 the user may prompt the BPU to initiate the boundary calculation/receiver programming process, at which point the BPU can transmit the boundary information to the receiver unit to be stored. The information may also remain stored in the BPU so that it may be used to transmit other receiver units, or to reinstall the information in the original receiver unit, without having to repeat the boundary information acquisition process. In other example embodiments, the boundary information stored in a first receiver unit may be transmitted for use within another receiver unit, so that a later acquired pet may be provided with the same boundary data in his/her receiver unit as that programmed in the first receiver unit. For example, in still other example embodiments, a BPU can retrieve the boundary information from a first receiver unit for storage and/or to transmit to a second receiver unit. In other words, the boundary information may be uploaded to the BPU or other hand held device and then downloaded into another receiver. In operation 1544, the BPU may notify the user that the receiver unit programming is complete, and the user may disconnect and turn off the BPU, ending the boundary programming mode in operation 1545.

Figure 19:
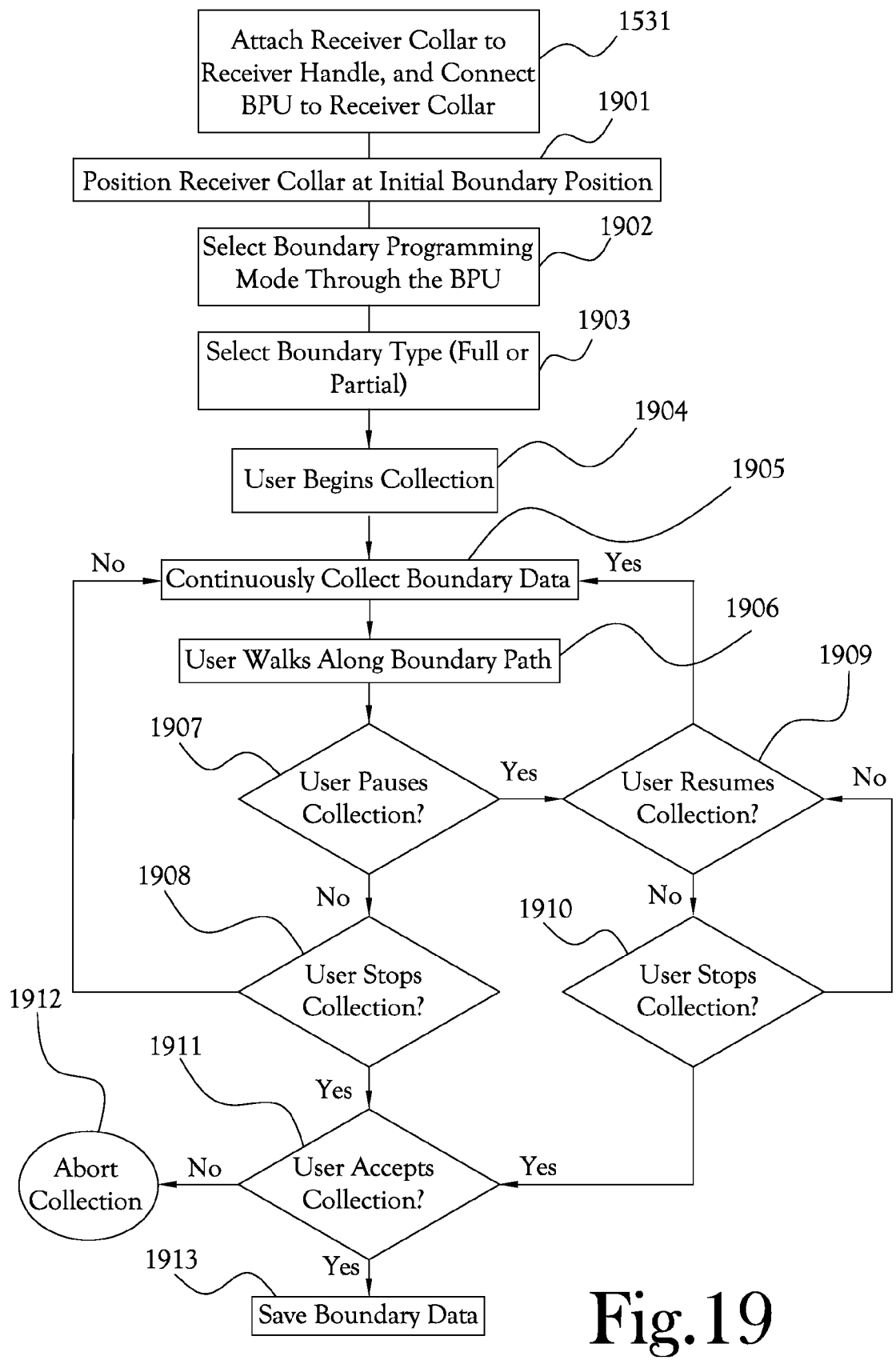

FIG. 19 illustrates operations that may be included in the boundary programming 1530 of FIG. 15 according to another example embodiment of the present general inventive concept. While FIG. 18 illustrates operations involved in manually programming the boundary at a plurality of points corresponding to flags that are positioned by the user, FIG. 19 illustrates a method of programming the boundary while the user moves in a continuous fashion along the desired boundary. For example, the collected boundary points may be collected along the boundary line by the user walking along the perimeter of the desired boundary, and the BPU may periodically (for example, at predetermined time intervals, predetermined angular coordinates, etc.) collect position data without the user having to stop at flags as previously described. As previously described in regard to FIG. 18, the user may attach the receiver unit to the receiver handle, and connect the BPU to the receiver unit in operation 1531. However, rather than positioning the receiver at a first flag as was described in operation 1532 of FIG. 18, in operation 1901 of FIG. 19 the user may simply position the receiver unit at an initial point of the desired boundary. The use of flags in the continuous boundary mode may be optional, and it is understood that for pet containment applications, the flags may be used in the operations illustrated and described in FIG. 19 to provide visual markers for the user during the walking of the boundary, and/or in the subsequent training of the pet to recognize the boundary. The positional data can thus be collected automatically by the BPU without the user stopping at any particular flag.

In operation 1902, the user may select the boundary programming mode through the user interface of the BPU, and may select the boundary type (full or partial) in operation 1903. It is possible that the user may select the option of a manual mode, such as illustrated in FIG. 18, or a continuous mode, such as illustrated in FIG. 19, through the user interface. In operation 1904, the user may prompt the BPU to begin acquiring location information at the initial boundary point, such as by choosing a "Start Collection" option through the user interface on the BPU.

After the user has made an entry to the BPU to begin position data collection in operation 1904, the BPU can begin to continuously collect boundary data in operation 1905. In operation 1906, the user walks around the boundary path to collect the boundary data. During the movement along the boundary path, the user may encounter various situations in which the user would like to temporarily cease the collection of boundary data, such as arriving at a physical barrier like a tree or building. In such a situation, the user may select an option through the BPU to cause the data collection to be paused in operation 1907. The pausing of the data collection may be initiated, for example, by the user pushing a button on the BPU, choosing the option through a graphical user interface, initiating a voice command, and so on. If the user does not pause the operation, but instead continues to walk and collect the position data along the boundary, the user may choose to stop the collection of position data in operation 1908. For example, the user may stop the collection data through the user interface of the BPU if the entirety of the boundary has been walked through the end point and the corresponding position data collected. If the user does not choose to stop the collection of position data in operation 1908, the BPU continues to collect the boundary data in operation 1905. In the event that the user does pause the collection of position data in operation 1907, the user may resume the collection of position data in operation 1909. For example, if the user paused the data collection to move to the other side of a building or other obstacle located on the boundary path, upon reaching the other side of the obstacle at which the boundary data collection is to be continued, the user may interact with the BPU to "un-pause" the data collection to resume the data collection, which causes a return to operation 1905. If the user does not resume the collection of data in operation 1909, the user may cause the collection of position data to be stopped entirely in operation 1910. After the user has caused the BPU, for example, through manipulating physical and/or touch screen buttons, or voice commands, or the like, of the BPU user interface, to stop the collection of boundary data in operations 1908 or 1910, the BPU may prompt the user to choose whether to accept the collected boundary data in operation 1911. If the user for some reason decides to not accept the collected boundary data, the data collection may be aborted in operation 1912 by a corresponding entry through the user interface. If the user decides to accept the collected boundary data in operation 1911, the user may make the corresponding entry through the user interface of the BPU, and save the boundary data in operation 1913. The user may continue to proceed as illustrated in operation 1541, and the following operations, in FIG. 18. It is understood that the operations involved in the collection of boundary data and/or programming of the receiver unit are not limited to the operations shown in FIGS. 18 and 19, nor must they be performed in any particular order, as the operations and sequence shown in those flow charts are intended as examples only. For example, in various example embodiments a user may use the continuous boundary data operations of FIG. 19 without programming the reference point shown in operation 1541 of FIG. 18. Other modifications to these operations, as well as additional or fewer operations, could be developed in view of the processes disclosed herein.

Figure 20:
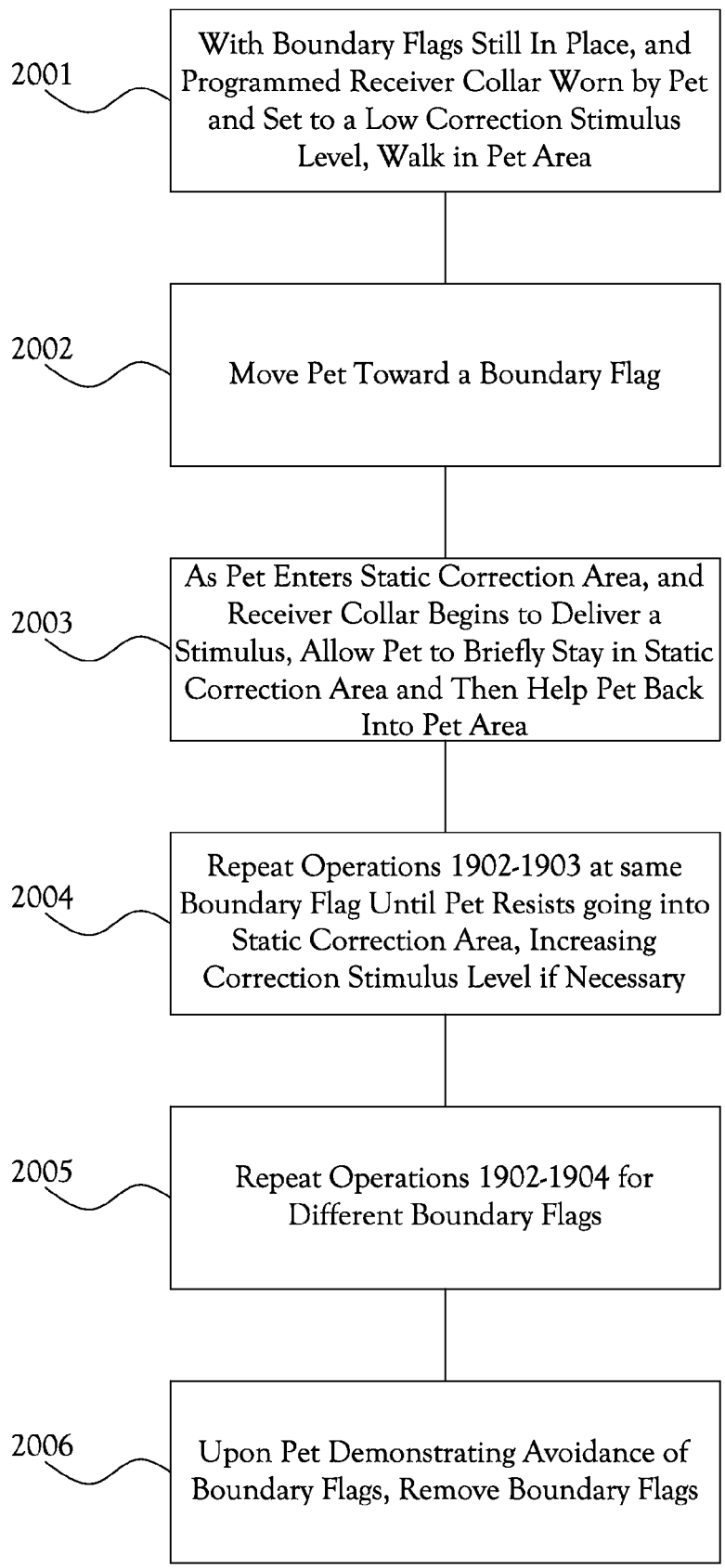
FIG. 20 is a flow chart illustrating an example method of training a pet to remain within a pet area using the boundary proximity determining system of an example embodiment of the present general inventive concept.

For pet containment applications, various training modes may be used in conjunction with the boundary determining system of example embodiments of the present general inventive concept. For example, after the boundary programming of the receiver unit 120, but before the removal of the boundary flags 420, a user may begin to acclimate the pet with the new boundary by using the visual cues provided by the boundary flags along with the corrective stimulus provided by the receiver unit. FIG. 20 is a flow chart illustrating an example method of training a pet to remain within a pet area using the boundary proximity determining system of an example embodiment of the present general inventive concept. In operation 2001, while the boundary flags are still in place, and the programmed receiver unit is worn by the pet and set to a low correction stimulus, such as only a low tone, a user may walk the pet in the newly delineated pet area. In operation 2002, the user may begin to move the pet toward one or more boundary flags. In operation 2003, as the pet enters the static correction area, and the receiver unit begins to deliver the low level corrective stimulus, the user may allow the pet to briefly stay in the static correction area before helping the pet back into the pet area. In operation 2004, the user may repeat the operations of moving the pet toward a boundary flag until the corrective stimulus is applied, and eventually helping the pet back into the allowed pet area, until the pet resists moving into the static correction area. The static correction level may be increased if necessary until the pet begins to resist entering the area. As indicated in operation 2005, the above described operations may then be repeated for different boundary flags until the pet recognizes the entirety of the boundary, and in operation 2006, upon the pet demonstrating an avoidance of the boundary flags, the user may remove the boundary flags. It is understood that the operations illustrated in FIG. 20 are merely examples of training methods that may be used with the boundary proximity determining system of the present general inventive concept, and many variations of the method may be employed within the scope of the present general inventive concept. For example, the user may decide to repeat some or all of the conditioning operations with an increased level of static correction after the pet has demonstrated an avoidance of the boundary with the low lever of corrective stimulus, and employing treats, toys, or the like to distract and newly tempt the pet into the forbidden area. It may disrupt the training method if the user openly attempts to coax or call the pet into the forbidden area, rather than employing methods of distraction.

The methods described herein may further include acclimating an animal to the boundary by (a) attaching the receiver to the animal, the receiver being configured to deliver a correction stimulus to the animal when the receiver is located a predetermined distance from the visual markers, (b) setting the receiver to deliver a low level correction stimulus, (c) moving the animal proximate to at least one of the visual markers such that the low level correction stimulus is delivered to the animal by the receiver, (d) keeping the animal proximate to the at least one visual marker such that the low level correction stimulus is applied to the animal for a predetermined amount of time, and (e) moving the animal away from the at least one visual marker to stop application of the low level correction stimulus. This method may further include repeating operations (b) through (d) to condition the animal to avoid a boundary point corresponding to the at least one visual marker, repeating operations (b) through (d) for all of the visual markers, and/or increasing an intensity of the correction stimulus during the repeating operations.

Although several example embodiments of the present general inventive concept have been described in terms of operating according to generated magnetic fields and sensed properties of those fields, it is understood that the present general inventive concept is not limited to such detection and processing. Any of several other methods of location determination may be used with the wireless boundary determination system and method. For example, some embodiments of the present general inventive concept may include detecting location properties generated by a signal transmitter transmitting types of signals other than a magnetic field, camera based location methods, and so on. Further, some example embodiments may not include a fence transmitter at all, but rather rely on location factors that originate from outside the system, such as GPS signals. In a system using GPS signals, for instance, the interaction between the BPU and receiver unit may operate similar to the processes described above in the magnetic field detection methods, except that the receiver unit may be determining GPS coordinates which are further processed, evaluated, stored, etc., by the BPU before being collected and/or formatted as boundary information which is then stored in the receiver unit.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A boundary determining system, comprising:
    at least one transmitter unit to generate and transmit a plurality of boundary signals;
    a receiver unit having one or more sensors to detect one or more characteristics of the boundary signals; and
    a user interface configured to communicate with the receiver unit, the user interface including a boundary program component to sequentially acquire boundary data corresponding to the plurality of boundary signals at a series of boundary perimeter locations, and to transmit the data and instructions to the receiver unit to enable the receiver unit to determine proximity of the receiver unit relative to each perimeter location.

2. The boundary determining system of claim 1, with said user interface further comprising a boundary test component to measure the plurality of boundary signals at each of the series of perimeter locations proximate a perimeter of a boundary area to determine whether one or more of the measured signals satisfy one or more prescribed conditions.

3. The boundary determining system of claim 1, with said user interface further comprising a boundary scan component to identify one or more geographic areas within the boundary where the one or more measured signals fail to satisfy one or more prescribed conditions.

4. The boundary determining system of claim 1, wherein the receiver unit is configured to be carried by an animal, and the receiver unit includes a stimulus delivery unit to deliver a stimulus to the animal when the receiver unit is located a predetermined distance relative to the perimeter of the boundary.

5. The boundary determining system of claim 4, wherein the boundary program component is configured to transmit instructions to the receiver unit to disable the stimulus delivery unit when the receiver unit enters a house or building within the boundary area.

6. The boundary determining system of claim 4, wherein the boundary area is a partial boundary, and the series of perimeter locations includes first and second locations respectively defining endpoints of the partial boundary, and the boundary program component is configured to disable the stimulus delivery unit when the receiver unit crosses an angular dependent reference line associated with the first and/or second location.

7. The boundary determining system of claim 6, wherein the boundary program component is configured to disable the stimulus delivery unit when the receiver unit crosses the angular dependent reference line from a first direction, and to enable the stimulus delivery unit when the receiver unit crosses the angular dependent reference line from a second direction.

8. The boundary determining system of claim 4, wherein the series of perimeter locations includes one or more locations respectively defining one or more doorway locations proximate a doorway of a house or building adjacent the boundary, and the boundary program component is configured to disable the stimulus delivery unit when the receiver unit crosses the doorway from a first direction, and to enable the stimulus delivery unit when the receiver unit crosses the doorway from a second direction.

9. The boundary determining system of claim 8, wherein the doorway location is a pet door.

10. The boundary determining system of claim 4, further comprising a remote signaling device operable by a user to transmit instructions to the receiver unit to enable and/or disable the stimulus delivery unit.

11. The boundary determining system of claim 1, wherein the receiver unit is provided with a processor to determine location information from the detected one or more characteristics of the boundary signals.

12. The boundary determining system of claim 1, wherein the receiver unit is provided with a communication unit to transmit the detected one or more characteristics of the boundary signals to a remote processor configured to determine location information of the receiver unit from the detected one or more characteristics of the boundary signals, and to receive the determined location information from the remote processor.

13. The boundary determining system of claim 1, wherein the receiver unit comprises:

a memory to store the data and instructions to enable the receiver unit to determine the proximity of the receive unit relative to the perimeter of the boundary; and
a communication unit to communicate the data and instructions for use with another receiver unit.

14. The boundary determining system of claim 13, wherein the communication unit is configured to communicate with a second receiver unit having different measurement sensitivities relative to said receiver unit, the user interface being configured to measure a reference point corresponding to the boundary data of said receiver unit and to calibrate the measurement sensitivities of the second receiver unit to enable the second receiver unit to determine a proximity of the second receiver unit relative to the boundary area perimeter consistent with said receiver unit.

15. The boundary determining system of claim 1, wherein the user interface is located within the receiver unit, and the receiver unit comprises:

a memory to store the data and instructions to enable the receiver unit to determine the proximity of the receiver unit relative to the perimeter of the boundary area.

16. The boundary determining system of claim 15 wherein the user interface comprises a communication means for transmitting data and instructions to a smart phone, a tablet device, a personal digital assistant (PDA), a portable game console, a portable/personal multimedia player (PMP), a handheld e-book, or a portable lab-top computer and/or receiving data and instructions from a smart phone, a tablet device, a personal digital assistant (PDA), a portable game console, a portable/personal multi-media player (PMP), a handheld e-book, or a portable lab-top computer.

17. The boundary determining system of claim 15 wherein the receiver unit comprises a communication unit to communicate the data and instructions to another receiver unit.

18. The boundary determining system of claim 1 wherein, the user interface is a smart phone, a tablet device, a personal digital assistant (PDA), a portable game console, a portable/personal multimedia player (PMP), a handheld e-book, or a portable lab-top computer.

19. The boundary determining system of claim 1 wherein the user interface comprises a communication means for transmitting data and instructions to a smart phone, a tablet device, a personal digital assistant (PDA), a portable game console, a portable/personal multimedia player (PMP), a handheld e-book, or a portable lab-top computer and/or receiving data and instructions from a smart phone, a tablet device, a personal digital assistant (PDA), a portable game console, a portable/personal multimedia player (PMP), a handheld e-book, or a portable lab-top computer.

20. The boundary determining system of claim 1 wherein the boundary is a partial boundary defined by a perimeter having separate beginning and ending points.

* * * * *